US012181020B2

United States Patent
Hiroshima et al.

(10) Patent No.: US 12,181,020 B2
(45) Date of Patent: Dec. 31, 2024

(54) COGGED V-BELT

(71) Applicant: Mitsuboshi Belting Ltd., Kobe (JP)

(72) Inventors: Takanori Hiroshima, Hyogo (JP); Akihiko Tokuda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 162 days.

(21) Appl. No.: 17/784,852

(22) PCT Filed: Dec. 11, 2020

(86) PCT No.: PCT/JP2020/046397
§ 371 (c)(1),
(2) Date: Jun. 13, 2022

(87) PCT Pub. No.: WO2021/117895
PCT Pub. Date: Jun. 17, 2021

(65) Prior Publication Data
US 2023/0003282 A1   Jan. 5, 2023

(30) Foreign Application Priority Data

Dec. 13, 2019  (JP) .................................. 2019-225458
Feb. 19, 2020  (JP) .................................. 2020-026205

(51) Int. Cl.
*F16G 5/20* (2006.01)
(52) U.S. Cl.
CPC ...................... *F16G 5/20* (2013.01)
(58) Field of Classification Search
CPC ..... F16H 5/20; F16G 5/20; F16G 1/08; F16G 5/10

(Continued)

(56) References Cited

U.S. PATENT DOCUMENTS

| 5,405,299 A | 4/1995 | Kubo et al. |
| 7,217,210 B2 * | 5/2007 | Wood ........................ F16G 1/28 474/260 |

(Continued)

FOREIGN PATENT DOCUMENTS

| CN | 203500376 U | 3/2014 |
| CN | 104487738 A | 4/2015 |

(Continued)

OTHER PUBLICATIONS

Mar. 2, 2021—International Search Report—Intl App PCTJP2020046397.

(Continued)

*Primary Examiner* — Michael R Mansen
*Assistant Examiner* — Juan J Campos, Jr.
(74) *Attorney, Agent, or Firm* — Banner & Witcoff, Ltd.

(57) ABSTRACT

The present invention relates to a cogged V-belt, including a cog portion containing cog ridges and cog valleys, and having a belt thickness of 19 to 36 mm and a cog height of 14 to 19 mm, in which the cog valley has a cross-sectional shape including a bottom portion formed by combining a plurality of continuous arcs and side walls of the cog valley, in which the plurality of arcs has curvature radius decreasing as a distance from a deepest portion of the cog valley increases, and includes a first arc passing through the deepest portion of the cog valley, having a diameter larger than a virtual circle tangent to the deepest portion and the both side walls and having a curvature radius of 7 to 10 mm.

7 Claims, 7 Drawing Sheets

(58) Field of Classification Search
USPC .......................................................... 474/238
See application file for complete search history.

(56) References Cited

U.S. PATENT DOCUMENTS

| | | | | |
|---|---|---|---|---|
| 7,357,742 | B2* | 4/2008 | Wagner | F16G 5/18 |
| | | | | 474/215 |
| 8,647,223 | B2* | 2/2014 | Kuwabara | F16G 5/16 |
| | | | | 474/242 |
| 9,677,643 | B2* | 6/2017 | Noguchi | F16G 5/20 |
| 2006/0079364 | A1* | 4/2006 | Skljarow | B65G 17/40 |
| | | | | 474/236 |
| 2012/0094795 | A1* | 4/2012 | Wang | F16G 5/20 |
| | | | | 474/205 |
| 2013/0190120 | A1* | 7/2013 | Fan | F16G 5/06 |
| | | | | 474/205 |
| 2015/0141186 | A1* | 5/2015 | Noguchi | F16G 5/10 |
| | | | | 474/205 |
| 2015/0152941 | A1 | 6/2015 | Sekiguchi et al. | |
| 2019/0085939 | A1* | 3/2019 | Matsukawa | B32B 5/024 |
| 2020/0200232 | A1 | 6/2020 | Ozaki et al. | |
| 2020/0362941 | A1 | 11/2020 | Takechi et al. | |

FOREIGN PATENT DOCUMENTS

| | | | |
|---|---|---|---|
| CN | 104520609 | A | 4/2015 |
| EP | 4075018 | A1 | 10/2022 |
| JP | H04-041140 | U | 4/1992 |
| JP | H06-249292 | A | 9/1994 |
| JP | 2571524 | B2 | 1/1997 |
| JP | 3068200 | U | 4/2000 |
| JP | 2002-013595 | A | 1/2002 |
| JP | 3733005 | B2* | 1/2006 |
| JP | 6227847 | B1 | 11/2017 |
| WO | 2014-017012 | A1 | 1/2014 |
| WO | 2017-204207 | A1 | 11/2017 |
| WO | 2019-138906 | A1 | 7/2019 |
| WO | 2021-117895 | A1 | 6/2021 |

OTHER PUBLICATIONS

Apr. 12, 2021—(JP) Written Explanation of Circumstances Concerning Accelerated Examination—App 2021-520241.
Jun. 22, 2021—(JP) Notification of Reasons for Refusal—App 2021-520241.
Sep. 7, 2021—(JP) Decision of Refusal—App 2021-520241.
Dec. 6, 2021—(JP) Written Explanation of Circumstances Concerning Accelerated Appeal Examination—App 2021-520241.
Dec. 6, 2021—(JP) Appeal Against Examiner's Decision of Rejection—App 2021-520240.
Jan. 4, 2022—(JP) Notification of Reasons for Refusal—App 2021-520241.
Mar. 23, 2022—(JP) Written Explanation of Circumstances Concerning Accelerated Examination—App 2021-198114.
May 10, 2022—(JP) Notification of Reasons for Refusal—App 2021-198114.
Dec. 6, 2021—(JP) Appeal Against Examiner's Decision of Rejection—App 2021-520241.
Jun. 13, 2023—(JP) Decision of Refusal—App 2022-180972.
Nov. 1, 2022—(JP) Decision of Refusal—App 2021-198114.
Mar. 2, 2021—Written Opinion (English Translation)—App PCT/JP2020/046397.
Nov. 11, 2022—(JP) Written Explanation of Circumstances Concerning Accelerated Examination—App 2021-198114.
Nov. 11, 2022—(JP) Written Explanation of Circumstances Concerning Accelerated Examination—App 2022-180972.
Nov. 11, 2022—(JP) Demand for a Trial—App 2021-198114.
Dec. 6, 2022—(JP) Notification of Reasons for Refusal—App 2021-198114.
Dec. 12, 2022—(JP) Notification of Reasons for Refusal—App 2022-180972.
Aug. 28, 2023—(CA) Office Action—App 3,163,908.
May 17, 2022—(WO) International Preliminary Report on Patentability—App PCT/JP2020/046397.
Jan. 23, 2024—(CN) Notification of First Office Action—CN App. 202080085604.4, Eng Tran.
Nov. 22, 2023—(EP) Extended Search Report—App 20897860.1.
Jul. 4, 2024—(CN) Notification of Second Office Action—CN App. 202080085604.4, Eng Tran.

* cited by examiner

COGGED V-BELT

CROSS REFERENCE TO RELATED APPLICATIONS

This is a U.S. National Phase Application under 35 U.S.C. § 371 of International Application No. PCT/JP2020/046397, filed Dec. 11, 2020, which claims priority to Japanese Application Nos. 2019-225458, filed Dec. 13, 2019, and 2020-026205, filed Feb. 19, 2020, which were published Under PCT Article 21(2), the entire contents of which are incorporated herein by reference.

TECHNICAL FIELD

The present invention relates to a cogged V-belt for frictional power transmission, which is useful for transmitting power by frictional power transmission, and more particularly, to a large-sized cogged V-belt, which is effectively used in a use environment with a large load such as a large-scale agricultural machine.

BACKGROUND ART

A power transmission belt used in a power transmission mechanism of a mechanical device or the like is roughly divided into a frictional power transmission belt and a meshing power transmission belt in terms of a power transmission form, and as the frictional power transmission belt, V-belts, V-ribbed belts, flat belts, and the like are known.

In addition, as an example of the V-belt, there is a raw edge-type belt (raw edge V-belt) in which a frictional power transmission surface (V-shaped side surface) is an exposed rubber layer. Examples of the raw edge-type belt include, in addition to raw edge V-belts with no cogs provided, so-called cogged V-belts such as a raw edge cogged V-belt in which bendability is improved by providing cogs only on the inner peripheral surface of the belt, and a raw edge cogged V-belt (raw edge double cogged V-belt) in which bendability is improved by providing cogs on both the inner peripheral surface and the outer peripheral surface of the belt.

In addition, in the V-belt, from the viewpoint of improving the lateral pressure resistance and the transmission force, it is required to increase the thickness of the entire belt (that is, to increase the area of the frictional power transmission surface). On the other hand, from the viewpoint of improving the bending fatigue resistance and the transmission efficiency, it is required to maintain good bendability by, for example, reducing the thickness of the entire belt. The cogs of the cogged V-belt are provided to meet such antinomy requirements. That is, cog ridges ensure a large frictional power transmission surface to improve the lateral pressure resistance and the transmission force, and cog valleys ensure the good bendability.

Incidentally, in the cogged V-belt, a series of operations (bending deformation) of bending and releasing the belt before and after winding around the pulley is continuously repeated. Specifically, since the belt wound around the pulley is bent around a cord, the belt distorts in a state where bending stress due to bending deformation is generated on the outer peripheral side of the cord and compression stress due to compression deformation is generated on the inner peripheral side of the cord. Then, the distortion is released as the belt moves away from the pulley with the running. During the running of the belt, the distorted state (curved shape) and the released state (planar shape) are repeated. In this series of operations (bending deformation), the bending of the cog valley is larger than the bending of the cog ridge. Therefore, the fatigue of a compression rubber layer repeatedly bent in the cog valley increases, and cracks are more likely to occur in the compression rubber layer in the cog valley than in the cog ridge. In particular, stress due to bending deformation is likely to be concentrated on the bottom portion of the cog valley (including the deepest portion of the cog valley), and various methods for relaxing the stress on the bottom portion of the cog valley to prevent cracks in the cog valley have been proposed.

For example, Patent Literature 1 discloses a cogged belt, in which a curve of a bottom portion of a cog valley is formed by a curve in which arcs having a plurality of curvatures are continuous, a curvature of an arc forming a curve of the deepest portion of the bottom portion of the cog valley among the arcs having the plurality of curvatures is formed to be the smallest (excluding zero curvature), and a curvature of an arc forming a curve close to a side surface of a cog ridge is formed to be large.

Further, Patent Literature 2 discloses a cogged V-belt, in which a tip portion in a projecting direction of each cog and a bottom portion of each groove portion are formed by a curved surface having an arc-shaped cross section, a curvature radius in the cross-sectional shape of the bottom portion of the groove portion is larger than a curvature radius in the cross-sectional shape of the tip portion of the cog, the cogged V-belt includes a cord embedded portion in which a cord is embedded, and a compression portion provided on the inner peripheral surface side of the cord embedded portion, and the cog and the groove portion are provided in the compression portion.

CITATION LIST

Patent Literature

Patent Literature 1: Japanese Patent No. 3733005
Patent Literature 2: Japanese Patent No. 6227847

SUMMARY OF INVENTION

Technical Problem

The cogged V-belt targeted in the present invention is a large-sized cogged V-belt suitable for a power transmission mechanism (in particular, a belt-type variable speed device) of a maximum-scale agricultural machine or the like. The size of the belt is, for example, a belt corresponding to HL to HQ (referred to in "ISO 3410: 1989") among standard products of the American Society of Agricultural and Biological Engineers (ASABE). There are standard products having a belt width (upper width) of 44.5 mm to 76.2 mm and a belt thickness of 19.8 mm to 30.5 mm, and also there is, for example, a nonstandard product having a belt thickness of 36 mm.

The cogged V-belt applied to such a power transmission mechanism of the maximum scale is one applied to a scale larger than the scale assumed in Patent Literatures 1 and 2, and it is necessary to design a unique product according to the use and the use environment. Therefore, simply diverting the design ideas of Patent Literatures 1 and 2 cannot be applied to the use environment of the cogged V-belt targeted in the present invention.

That is, in a belt-type variable speed device belonging to a small-sized (small-scale) use environment, it is necessary to ensure high bendability by giving priority to being able to be wound around a pulley having a small diameter. On the other hand, in a belt-type variable speed device belonging to a large-sized (large-scale) use environment, it is necessary to ensure a high level of the lateral pressure resistance and the transmission force in order to withstand the load level of the power transmission mechanism while appropriately ensuring bendability.

Specifically, in the cogged V-belt applied to the large-sized (large-scale) use environment, since the lateral pressure received from the pulley is enormous, it is necessary to take measures of increasing the belt thickness (the area of the frictional power transmission surface) or increasing the hardness (increasing the elastic modulus) of the rubber layer, in order to secure the sufficient lateral pressure resistance.

Alternatively, since the tension applied to the belt is also enormous, it is necessary to take measures of increasing the elastic modulus of the belt. Since the elastic modulus of the belt is governed by a cord which is a tension member, a cord having high rigidity is used to increase the elastic modulus of the belt. Specifically, in order to increase the rigidity of the cord, for example, a material having a high elastic modulus is used, the diameter is increased, the belt width is increased for increasing the number of turns of the cord, or the cord is densely arranged by narrowing the interval when the width cannot be increased. Therefore, a portion in which the cord is embedded becomes rigid.

Then, in either case, these measures impair the bendability of the belt, and the stress of the cog valley received by the bending deformation is enormous.

Actually, even if the cog shapes described in Patent Literatures 1 and 2 (for example, an arc R of the deepest portion of the bottom portion of the cog valley, an arc R forming the curve close to the side surface of the tip portion of the cog, and a shape of the tip portion of the cog) are simply enlarged in a homothetic manner and applied to the cogged V-belt having the maximum size of HL to HQ, the effect of preventing cracks cannot be sufficiently obtained in the large-sized (large-scale) use environment targeted in the present invention.

The present invention has been made in view of the above-described problems, and an object thereof is to provide a cogged V-belt being capable of ensuring the high lateral pressure resistance and transmission force, relaxing stress at a bottom portion of a cog valley (including the deepest portion of the cog valley) on which the stress due to bending deformation is likely to be concentrated, and preventing the occurrence of cracks in the cog valley, in a cogged V-belt of a large size suitable for a power transmission mechanism (in particular, a belt-type variable speed device) of an agricultural machine or the like of a maximum scale.

Solution to Problem

The above-described object of the present invention is achieved by the following configurations.

(1) A cogged V-belt,
including a cog portion in which a large number of cog ridges and cog valleys are alternately provided along a belt longitudinal direction, provided at least on a belt inner peripheral side, and
having a belt thickness H of 19 to 36 mm and a cog height $H_1$ of 14 to 19 mm,
in which the cog valley has a cross-sectional shape in a cross section in the belt longitudinal direction, including:
a bottom portion formed by combining a plurality of continuous arcs; and
side walls of the cog valley inclined with respect to a belt thickness direction,
in which the plurality of arcs forming the bottom portion has curvature radius decreasing as a distance from a deepest portion of the cog valley increases, and
in which the plurality of arcs includes a first arc, and the first arc passes through the deepest portion of the cog valley, has a diameter larger than a virtual circle tangent to three points of the deepest portion and the side walls on both sides of the cog valley, and has a curvature radius $R_1$ of 7 to 10 mm.

According to this configuration, even in a cogged V-belt having a large size suitable for a power transmission mechanism of an agricultural machine or the like of a maximum scale, it is possible to ensure the high lateral pressure resistance and transmission force, to relax and disperse stress at the bottom portion of the cog valley on which the stress due to bending deformation is likely to be concentrated, and to prevent the occurrence of cracks in the cog valley. In addition, since the bottom portion is formed by the plurality of arcs whose curvature radius decreases as the distance from the deepest portion of the cog valley increases, a length of the cog portion in the belt longitudinal direction (cog width) can be increased as compared with a case where the bottom portion of the cog valley is formed by only the first arc having the curvature radius $R_1$, and a large contact area with the pulley can be ensured.

(2) The cogged V-belt according to (1),
in which the plurality of arcs includes the first arc and a second arc that connects the first arc and an extension line of the side wall in a curved shape so as to be tangent to the first arc and the extension line of the side wall, and
the second arc has a curvature radius $R_2$ of 1.8 to 2.5 mm.

According to this configuration, since the curvature radius $R_2$ of the second arc is 1.8 to 2.5 mm, which is smaller than the curvature radius $R_1$ of the first arc, the stress to the deepest portion of the cog valley where the stress is most concentrated during bending is dispersed, and the cracks in the cog valley can be more effectively prevented.

(3) The cogged V-belt according to (1) or (2),
including a tension member layer including a cord arranged at intervals in a belt width direction, a tension rubber layer laminated on a belt outer peripheral side of the tension member layer, and a compression rubber layer laminated on the belt inner peripheral side of the tension member layer, and
having a center-valley thickness $H_2$, which is a distance from a center portion of the cord to the deepest portion of the cog valley, being 6 to 13 mm, and a ratio of the center-valley thickness $H_2$ to the belt thickness H being 20 to 40%.

According to this configuration, it is possible to achieve a good balance between the contact area (lateral pressure resistance) in contact with the pulley and the stress reduction during bending.

(4) The cogged V-belt according to any one of (1) to (3),
in which the cog ridge has a side surface and a top portion, each formed in a straight line.

According to this configuration, it is possible to ensure a large area of a frictional power transmission surface (the contact area with the pulley), and the lateral pressure resistance to the pulley and the transmission force due to the friction are improved.

(5) The cogged V-belt according to any one of (1) to (4), being used for a power transmission belt of a belt-type variable speed device of a large-sized agricultural machine.

According to this configuration, the cogged V-belt can be suitably used for the power transmission belt of the belt-type variable speed device of the large-sized agricultural machine.

Advantageous Effects of Invention

According to the cogged V-belt of the present invention, in order to be applied to a use environment such as a power transmission mechanism (in particular, a belt-type variable speed device) of an agricultural machine of a maximum scale in which the high lateral pressure resistance and transmission force are required, even in a cogged V-belt having a large size in which bendability of the belt may be impaired, it is possible to ensure the high lateral pressure resistance and transmission force, to relax stress at a bottom portion of a cog valley (including the deepest portion of the cog valley) on which the stress due to bending deformation is likely to be concentrated, and to prevent the occurrence of cracks in the cog valley.

DESCRIPTION OF EMBODIMENTS

Figure 1:
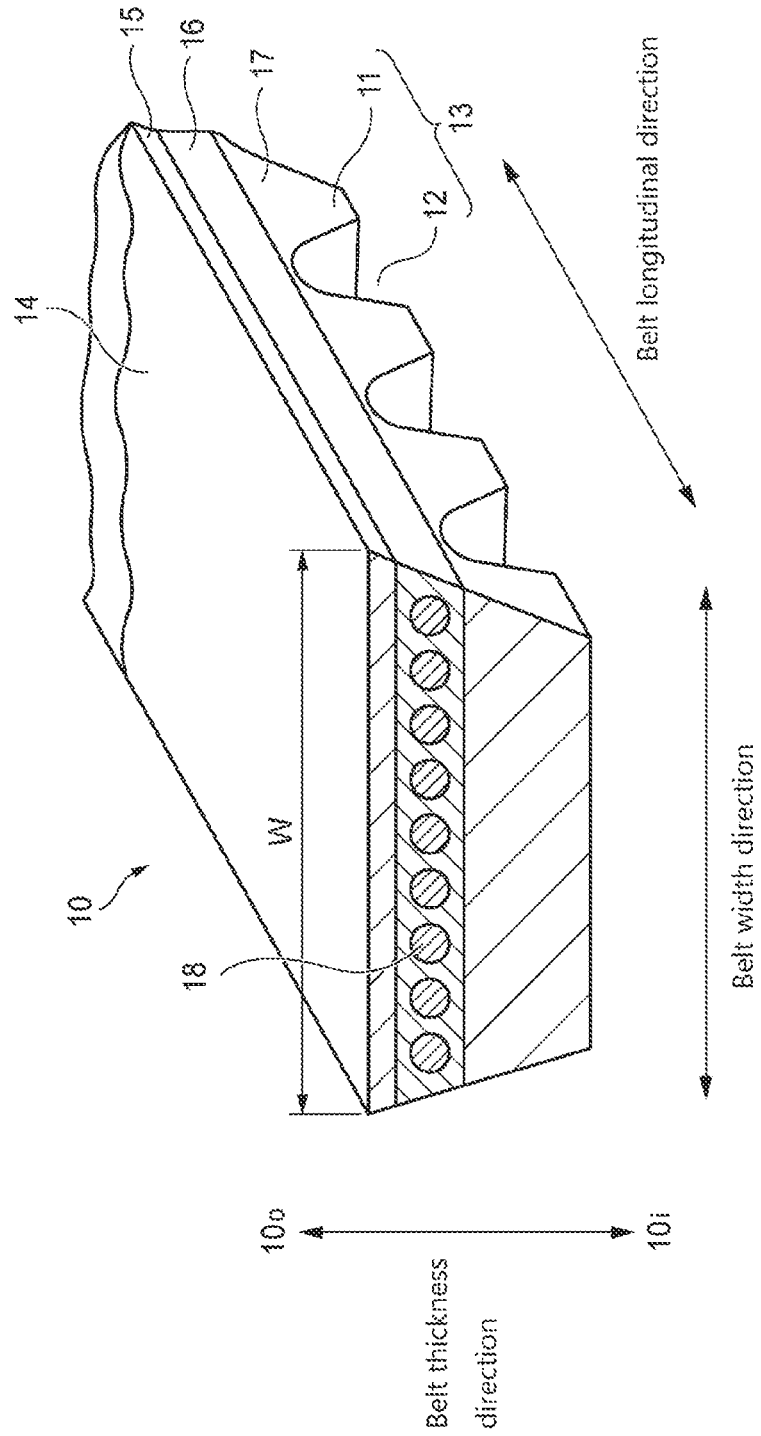
FIG. 1 is a perspective view of a cogged V-belt according to the present invention, illustrated by cutting in a belt width direction.

Hereinafter, a cogged V-belt according to an embodiment of the present invention will be described in detail with reference to the drawings. In the following description, as illustrated in FIG. 1, a longitudinal direction of the cogged V-belt is referred to as a belt longitudinal direction, a direction orthogonal to the belt longitudinal direction and in which a plurality of cords is arranged is referred to as a belt width direction, and a direction orthogonal to the belt longitudinal direction and the belt width direction is referred to as a belt thickness direction.

[1. Basic Configuration of Cogged V-Belt]

A raw edge cogged V-belt (cogged V-belt) 10 according to the present embodiment is a large-sized belt used in a power transmission mechanism (in particular, a belt-type variable speed device) of an agricultural machine of a maximum-scale or the like. As illustrated in FIG. 1, the raw edge cogged V-belt 10 has cog portions 13 in which cog ridges 11 and cog valleys 12 are alternately arranged along the belt longitudinal direction on an inner peripheral side $10_i$ of a belt body. The raw edge cogged V-belt 10 has a laminated structure, and has a configuration in which a reinforcing fabric 14, a tension rubber layer 15, a tension member layer 16, and a compression rubber layer 17 are sequentially laminated from a belt outer peripheral side 100 toward the belt inner peripheral side $10_i$ (a side on which the cog portions 13 are formed). That is, in the raw edge cogged V-belt 10, the tension rubber layer 15 is laminated on the belt outer peripheral side 100 of the tension member layer 16, and the compression rubber layer 17 is laminated on the belt inner peripheral side $10_i$ of the tension member layer 16.

The cross-sectional shape in the belt width direction is a trapezoidal shape in which an upper width W, which is a portion where the belt width is maximum, decreases from the belt outer peripheral side $10_o$ toward the belt inner peripheral side $10_i$. Further, cords 18 serving as tension members are embedded in the tension member layer 16 in a state of being arranged at intervals in the belt width direction. The cog portions 13 are formed in the compression rubber layer 17 by a molding die with cogs which is not illustrated.

A relationship between the upper width W and a belt thickness H of the cogged V-belt 10 according to the present embodiment, that is, a ratio of the upper width W to the belt thickness H (also referred to as "upper width W/belt thickness H" or "aspect ratio") is not particularly limited, and is preferably 1.2 to 3.8, and more preferably 1.5 to 2.5, from the viewpoint of ensuring the lateral pressure resistance.

[2. Materials Usable for Portions of Cogged V-Belt]

Next, materials that can be used for each portion of the raw edge cogged V-belt (cogged V-belt) 10 will be listed.

<2-1. Compression Rubber Layer>

The compression rubber layer 17 is formed of a rubber composition (vulcanized rubber composition) containing a first rubber component.

(First Rubber Component)

As the first rubber component, vulcanizable or cross-linkable rubber is preferably used, and examples thereof include diene rubbers [a natural rubber, an isoprene rubber, a butadiene rubber, a chloroprene rubber, a styrene-butadiene rubber (SBR), an acrylonitrile butadiene rubber (nitrile rubber), a hydrogenated nitrile rubber, or the like], an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, and a fluorine rubber. These rubber components can be used alone or in combination of two or more thereof.

Among these, the ethylene-α-olefin elastomer and the chloroprene rubber are preferable, and the ethylene-α-olefin elastomer [ethylene-propylene copolymer (EPM), ethylene-propylene-diene terpolymer (EPDM), or the like] is particularly preferable from the viewpoint of improving durability such as ozone resistance, heat resistance, cold resistance, weather resistance, and crack resistance.

In the case where the first rubber component contains the ethylene-α-olefin elastomer, the proportion of the ethylene-α-olefin elastomer in the first rubber component may be 50% by mass or more, preferably 80% by mass or more, more preferably 90% by mass or more (particularly 90% to 100% by mass), and most preferably 100% by mass (only the ethylene-α-olefin elastomer), from the viewpoint of improving fuel efficiency and durability. In the case where the first rubber component contains the chloroprene rubber, the proportion of the chloroprene rubber is the same as the proportion of the ethylene-α-olefin elastomer.

(First Short Fiber)

The rubber composition forming the compression rubber layer 17 may further contain first short fibers. Examples of the first short fibers include: synthetic short fibers such as polyamide short fibers (polyamide 6 short fibers, polyamide 66 short fibers, polyamide 46 short fibers, aramid short fibers, or the like), polyalkylene arylate short fibers (for example, polyethylene terephthalate (PET) short fibers and polyethylene naphthalate short fibers), liquid crystal polyester short fibers, polyarylate short fibers (amorphous wholly aromatic polyester short fibers or the like), vinylon short fibers, polyvinyl alcohol-based short fibers, and polyparaphenylene benzobisoxazole (PBO) short fibers; natural short fibers such as cotton, hemp, and wool; and inorganic short fibers such as carbon short fibers. These first short fibers can be used alone or in combination of two or more thereof. Among these, the aramid short fibers and the PBO short fibers are preferable, and the aramid short fibers are particularly preferable.

The first short fibers may be short fibers obtained by cutting fibers stretched in a fibrous shape into a predetermined length. The first short fibers are preferably oriented in the belt width direction and embedded in the compression rubber layer 17 in order to prevent compression deformation of the belt due to the lateral pressure from the pulley (that is, in order to enhance the lateral pressure resistance). In addition, since noise (sound generation) can be prevented by reducing the friction coefficient of the surface and wear due to friction with the pulley can be reduced, it is preferable to make the short fibers protrude from the surface of the compression rubber layer 17.

An average fiber length of the first short fibers may be, for example, about 0.1 to 20 mm, preferably about 0.5 to 15 mm (for example, about 0.5 to 10 mm), and more preferably about 1 to 6 mm (particularly about 2 to 4 mm), from the viewpoint that the lateral pressure resistance and the wear resistance can be improved without reducing the bendability. If the fiber length of the first short fibers is too short, the mechanical characteristics in a grain direction cannot be sufficiently enhanced, and the lateral pressure resistance and the wear resistance may be reduced. On the other hand, if the fiber length is too long, the orientation of the short fibers in the rubber composition may decrease, and the bendability may decrease.

A single yarn fineness of the first short fiber may be, for example, about 1 to 12 dtex, preferably about 1.2 to 10 dtex (for example, 1.5 to 8 dtex), and more preferably about 2 to 5 dtex (particularly about 2 to 3 dtex), from the viewpoint that a high reinforcing effect can be imparted without reducing the bendability. If the single yarn fineness is too large, the lateral pressure resistance and the wear resistance per blending amount may decrease, and if the single yarn fineness is too small, the dispersibility in rubber may decrease and the bendability may decrease.

The first short fibers may be subjected to an adhesion treatment (or a surface treatment) by a common method in order to increase the adhesive strength with the first rubber component. Examples of the method of the surface treatment include a method of treating with a treatment liquid or the like containing a common surface treatment agent. Examples of the surface treatment agent include an RFL liquid containing resorcin (R), formaldehyde (F) and rubber or latex (L) [for example, an RFL liquid containing a condensate (RF condensate) formed by resorcin (R) and formaldehyde (F), and the rubber component such as vinylpyridine-styrene-butadiene copolymer rubber], an epoxy compound, a polyisocyanate compound, a silane coupling agent, and a vulcanized rubber composition (for example, a vulcanized rubber composition containing wet-process white carbon containing a surface silanol group and containing hydrated silicic acid as a main component, which is advantageous for enhancing the chemical bonding force with rubber). These surface treatment agents may be used alone or in combination of two or more thereof, and the short fibers may be sequentially treated with the same or different surface treatment agents for a plurality of times.

The proportion of the first short fibers with respect to 100 parts by mass of the first rubber component is, for example, about 5 to 50 parts by mass, preferably about 5 to 40 parts by mass (for example, about 8 to 35 parts by mass), and more preferably about 10 to 30 parts by mass (particularly about 20 to 30 parts by mass). If the proportion of the first short fibers is too small, the lateral pressure resistance and the wear resistance may decrease, and if the proportion is too large, the processability may decrease, or the bendability of the belt may decrease, such that the durability may decrease.

(Other Components)

Examples of the rubber composition forming the compression rubber layer 17 include a vulcanizing agent or a cross-linking agent (or a cross-linking agent based additive) (a sulfur-based vulcanizing agent or the like), a co-cross-linking agent (bismaleimides or the like), a vulcanization aid or a vulcanization accelerator (a thiuram accelerator or the like), a vulcanization retarder, a metal oxide (zinc oxide, magnesium oxide, calcium oxide, barium oxide, iron oxide, copper oxide, titanium oxide, aluminum oxide, or the like), a reinforcing agent (carbon black, or silicon oxide such as hydrous silica), a filler (clay, calcium carbonate, talc, mica, or the like), a softener (oils such as paraffin oil and naphthenic oil), a processing agent or a processing aid (stearic acid, metal stearate, wax, paraffin, fatty acid amide, or the like), an anti-aging agent (an antioxidant, an anti-heat aging agent, a bending-crack inhibitor, an ozone-deterioration inhibitor, or the like), a coloring agent, a tackifier, a plasticizer, a coupling agent (a silane coupling agent or the like), a stabilizer (an ultraviolet absorber, a heat stabilizer, or the like), a flame retardant, and an antistatic agent. These additives may be used alone or in combination of two or more thereof. The metal oxide may act as a cross-linking agent.

<2-2. Tension Rubber Layer>

The raw edge cogged V-belt 10 may further include the tension rubber layer 15 formed of a rubber composition (vulcanized rubber composition) containing a second rubber component.

As the second rubber component, the rubber components exemplified in the first rubber component can be used, and preferred embodiments are also the same as those of the first rubber component. The second rubber component may be a rubber component different from the first rubber component, but is generally the same as the first rubber component.

The rubber composition forming the tension rubber layer 15 also preferably contains second short fibers from the viewpoint of further improving the lateral pressure resistance and the wear resistance. In the case where not only the compression rubber layer 17 but also the tension rubber layer 15 contains the second short fibers as the short fibers, the lateral pressure resistance and the wear resistance are further improved. As the second short fibers, the short fibers exemplified as the first short fibers can be used, and preferred embodiments and proportions are also the same as those of the first short fibers. The second short fibers may be short fibers different from the first short fibers, but are generally the same as the first short fibers. The rubber composition forming the tension rubber layer 15 may also further contain other components exemplified in the rubber composition forming the compression rubber layer 17.

<2-3. Tension Member Layer>

The cords 18 included in the tension member layer 16 are generally twisted cords arranged at predetermined intervals in the belt width direction. The cords 18 are arranged so as to extend in the belt longitudinal direction. A plurality of cords 18 parallel to the belt longitudinal direction may be arranged. From the viewpoint of the productivity, generally, the cord(s) 18 is (are) arranged in a spiral shape so as to extend in parallel at a predetermined pitch substantially in parallel with the belt longitudinal direction of the raw edge cogged V-belt 10. In the case where the cord(s) 18 is (are) arranged in a spiral shape, an angle of the cord 18 with respect to the belt longitudinal direction may be, for example, 5° or less, and from the viewpoint of belt running properties, it is preferable that the angle is closer to 0°. In addition, the pitch of the cord(s) 18 is preferably set in a range of 2.0 to 2.5 mm, and more preferably set in a range of 2.2 to 2.4 mm.

The tension member layer 16 may be formed of only the cord(s) 18 as long as the tension member layer 16 includes the cord(s) 18 whose arrangement density is adjusted, but the tension member layer 16 (adhesion rubber layer) formed of the vulcanized rubber composition in which the cord(s) 18 are embedded is preferable from the viewpoint of preventing the inter-layer delamination and improving the belt durability.

Figure 2:
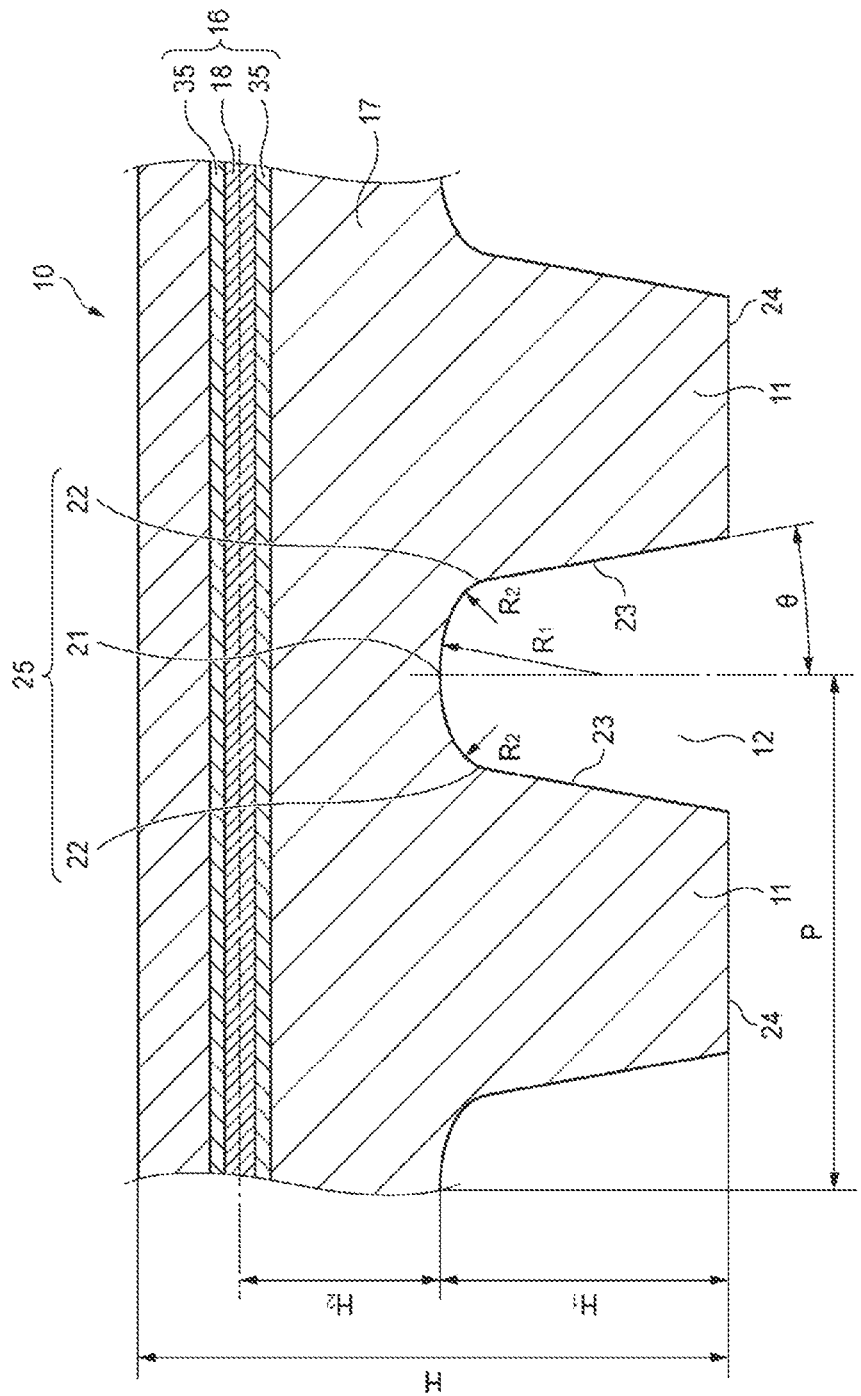
FIG. 2 is a cross-sectional view in a longitudinal direction of the cogged V-belt illustrated in FIG. 1.

The tension member layer 16 formed of the vulcanized rubber composition in which the cord(s) 18 are embedded is generally referred to as an adhesion rubber layer 35, and the cord(s) 18 are embedded in a layer formed of the vulcanized rubber composition containing a rubber component (see FIG. 2). The adhesion rubber layer 35 is interposed between the tension rubber layer 15 and the compression rubber layer 17 to adhere the tension rubber layer 15 and the compression rubber layer 17, and the cord(s) 18 is (are) embedded in the adhesion rubber layer 35. The embedded form of the cord(s) 18 is not particularly limited, and it may have a form in which a part of the cord(s) 18 is embedded in the adhesion rubber layer 35, and from the view point that the durability can be improved, a form in which the cord(s) 18 is (are) embedded in the adhesion rubber layer 35 (that is, a form in which the entire cord(s) 18 is (are) completely embedded in the adhesion rubber layer) is preferable.

(Cord)

As the cord 18, a twisted cord using multifilament yarns (for example, plied twists, single twists, Lang twists) can be generally used.

As fibers constituting the cord 18, widely used are: synthetic fibers such as polyolefin fibers (a polyethylene fiber, a polypropylene fiber, or the like), polyamide fibers (a polyamide 6 fiber, a polyamide 66 fiber, a polyamide 46 fiber, an aramid fiber, or the like), polyester fibers (polyalkylene arylate fibers) [poly $C_{2-4}$ alkylene-$C_{6-14}$ arylate fibers such as a polyethylene terephthalate (PET) fiber and a polyethylene naphthalate (PEN) fiber], vinylon fibers, polyvinyl alcohol fibers, and polyparaphenylene benzobisoxazole (PBO) fibers; natural fibers such as cotton, hemp, and wool; and inorganic fibers such as carbon fibers. These fibers may be used alone or in combination of two or more thereof.

Among these fibers, from the viewpoint of a high modulus, synthetic fibers such as polyester fibers (polyalkylene arylate fibers) containing, as a main constituent unit, a $C_{2-4}$ alkylene-$C_{6-12}$ arylate, such as ethylene terephthalate and ethylene-2,6-naphthalate, and polyamide fibers (such as an aramid fiber), and inorganic fibers such as a carbon fiber are widely used. Among these, preferred are polyester fibers (particularly, a polyethylene terephthalate fiber and a polyethylene naphthalate fiber) and polyamide fibers (particularly, an aramid fiber).

The fibers may be multifilament yarns. The fineness of the multifilament yarns may be, for example, about 2,000 to 10,000 denier (particularly about 4,000 to 8,000 denier). The multifilament yarns may contain, for example, about 100 to 5,000 monofilament yarns, preferably 500 to 4,000 monofilament yarns, and more preferably 1,000 to 3,000 monofilament yarns.

The cord 18 is formed of, for example, a twisted cord using multifilament yarns (for example, plied twist, single twist, and Lang twist). An average cord diameter (a diameter of the twisted cord) of the cord 18 may be, for example, about 0.5 to 3.0 mm, preferably about 1.0 to 2.5 mm, more preferably about 1.5 to 2.3 mm, and still more preferably about 1.7 to 2.1 mm (particularly about 1.8 to 2.0 mm). If the cord 18 is too thin, the bendability is improved, but the tension of the belt decreases, and the belt is cut in the worst case. On the other hand, if the cord 18 is too thick, the bending resistance of the belt may decrease, whereby the belt may generate excessive heat.

In the case where the cord(s) 18 is (are) embedded in the adhesion rubber layer 35, the cord 18 may be subjected to a surface treatment in order to improve the adhesiveness to the vulcanized rubber composition forming the adhesion rubber layer 35. Examples of the surface treatment agent include the surface treatment agents exemplified as the surface treatment agents for the short fibers of the compression rubber layer 17 described above. The surface treatment agents may be used alone or in combination of two or more thereof, and the cord 18 may be sequentially treated with the same or different surface treatment agents for a plurality of times. The cord 18 is preferably subjected to an adhesion treatment with at least a resorcin-formalin-latex treatment liquid (RFL liquid).

(Adhesion Rubber Layer)

As the rubber component constituting the vulcanized rubber composition forming the adhesion rubber layer 35, the rubber component exemplified as the rubber component of the compression rubber layer 17 can be used, and preferred embodiments are also the same as the rubber component of the compression rubber layer 17. The rubber composition forming the adhesion rubber layer 35 may also further contain the short fibers and other components exemplified in the rubber composition forming the compression rubber layer 17.

<2-4. Reinforcing Fabric>

In the case where the reinforcing fabric 14 is used in the raw edge cogged V-belt 10, it is not limited to the form in which the reinforcing fabric 14 is laminated on the surface of the tension rubber layer 15, and for example, may be a form in which the reinforcing fabric 14 is laminated on the surface of the tension rubber layer 15 and/or the compression rubber layer 17 (the surface of the cog portion 13), or may be a form in which a reinforcing layer may be embedded in the tension rubber layer 15 and/or the compression rubber layer 17 (for example, the form described in JP-A-2010-230146).

The reinforcing fabric 14 can be formed of, for example, a fabric material such as a woven fabric, a wide angle woven fabric, a knitted fabric, or a nonwoven fabric (preferably, a woven fabric). The reinforcing fabric 14 may be laminated on the surface of the tension rubber layer 15 and/or the compression rubber layer 17 after, if necessary, the above-described adhesion treatment such as a treatment with an RFL liquid (such as an immersion treatment) or a friction for rubbing an adhesion rubber into the fabric material is performed, or the adhesion rubber and the fabric material are laminated (coated) on each other.

[3. Specific Structure of Cogged V-Belt]

Next, a specific structure which is a characteristic portion of the raw edge cogged V-belt (cogged V-belt) 10 according to the present embodiment will be described. As illustrated in FIG. 2, the cross-sectional shape of the cog portion 13 in the belt longitudinal direction is formed to have the same dimensions over the belt width direction. In addition, as illustrated in FIG. 2 and FIG. 3, the cross-sectional shape of the cog valley 12 is formed by connecting a bottom portion 25, which is formed by combining a plurality of continuous arcs (in the embodiment illustrated in FIG. 2 and FIG. 3, three arcs of a first arc 21 and a pair of second arcs 22), and a side wall 23 of the cog valley 12 that is inclined at a cog angle θ (one side) with respect to the belt thickness direction (a direction indicated by a one-dot chain line in FIG. 2).

In a state where the raw edge cogged V-belt 10 is not bent, the curvature radius of the plurality of arcs (the first arc 21 and the second arcs 22) constituting the bottom portion 25 decreases as a distance from a deepest portion A of the cog valley 12 increases.

Figure 3:
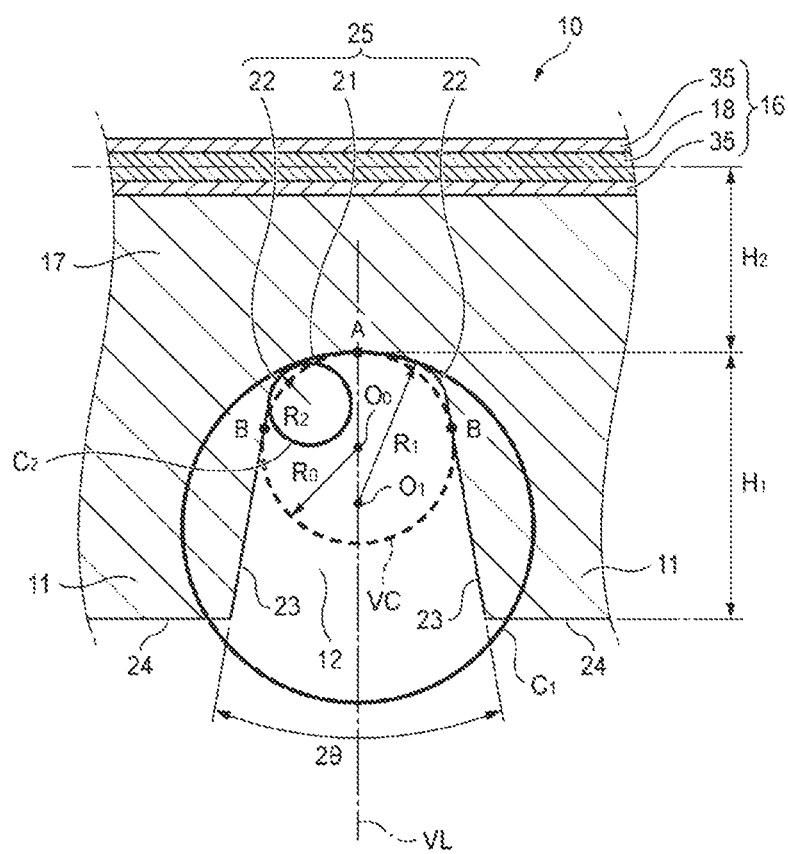
FIG. 3 is an enlarged view illustrating a shape of a cog valley illustrated in FIG. 2.

Specifically, as illustrated in FIG. 3, the first arc 21 has a center $O_0$ on a vertical line VL orthogonal to the belt longitudinal direction, and is formed by a circle $C_1$ having a diameter larger than a virtual circle VC that passes through the deepest portion A of the cog valley 12 and is tangent to three points of the deepest portion A of the cog valley 12 and the side walls 23 on both sides. That is, a curvature radius $R_1$ of the first arc 21 is larger than a radius $R_0$ of the virtual circle VC.

In addition, the second arc 22 in the present embodiment is formed by connecting the first arc 21 and an extension line of the side wall 23 of the cog valley 12 in a curved shape so as to be tangent to the first arc 21 and the extension line by a circle $C_2$ having a curvature radius $R_2$ smaller than the curvature radius $R_1$ of the first arc 21.

As described above, since the cogged V-belt 10 is applied to a large-sized belt having the belt thickness H of 19 to 36 mm and a cog height $H_1$ of 14 to 19 mm, the curvature radius $R_1$ of the first arc 21 is set in a range of 7 to 10 mm, and preferably is set in a range of 7.5 to 9.5 mm. In addition, the curvature radius $R_2$ of the second arc 22 is preferably set in a range of 1.5 to 2.8 mm, and more preferably set in a range of 1.8 to 2.5 mm. Accordingly, since the curvature of the deepest portion A of the cog valley 12 is the smallest (that is, the curvature radius is the largest), it is possible to reduce the stress concentrated on the deepest portion A of the cog valley 12 when the belt is bent and to disperse the stress, and it is possible to prevent the occurrence of cracks in the deepest portion A of the cog valley 12.

It is preferable that a center-valley thickness $H_2$, which is a distance from a center portion of the cord 18 to the deepest portion A of the cog valley 12, is 6 to 13 mm, and the ratio of the center-valley thickness $H_2$ to the belt thickness H is 20 to 40%. Accordingly, it is possible to obtain a good balance between the contact area (lateral pressure resistance) in contact with the pulley and the stress reduction during bending.

Further, a pitch P of the cog portions 13 is preferably set in a range of 24 to 28 mm, and more preferably set in a range of 25 to 27 mm. In addition, the cog angle (one side) θ is preferably set in a range of 5 to 15°, and more preferably set in a range of 8 to 12°.

On the other hand, in the present embodiment, the cog ridge 11 is formed by connecting a straight top portion 24 and straight side surfaces (the side walls 23 of the cog valley) on both sides in the belt longitudinal direction. That is, each of the side walls 23 and the top portion 24 of the cog ridge 11 is formed in a straight line. Accordingly, it is possible to ensure a large area of a frictional power transmission surface (the contact area with the pulley), and the lateral pressure resistance to the pulley and the transmission force due to the friction are improved.

In order to prevent chipping of an edge portion, it is preferable to perform C chamfering of C 0.5 mm to C 2.0 mm or R chamfering of R 0.5 mm to R 2.0 mm at an intersection of the side wall 23 and the top portion 24 of the cog ridge 11.

[4. Method of Manufacturing Cogged V-Belt]

Next, a method of manufacturing the raw edge cogged V-belt (cogged V-belt) 10 will be described. The method of manufacturing the raw edge cogged V-belt 10 is not particularly limited, and a common method can be used for a lamination process of each layer (a method of manufacturing a belt sleeve).

<4-1. First Manufacturing Method>

For example, when the raw edge cogged V-belt 10 in which the cog portion 13 is formed at least on the belt inner peripheral side $10_i$ is produced, as a cylindrical mold, a cogged mold or the like in which an uneven surface corresponding to the cog shape is engraved on the outer peripheral side surface of the cylinder can be used.

An unvulcanized sheet for a compression rubber layer, which has been previously formed into a cog shape, and an unvulcanized sheet for a first adhesion rubber layer (lower adhesion rubber) are sequentially wound around the cylindrical mold (cogged mold) and are laminated, and a cord to be a tension member is spirally spun, and then [if necessary, an unvulcanized sheet for a second adhesion rubber layer (upper adhesion rubber) which is the same as the sheet for the first adhesion rubber layer], an unvulcanized sheet for a tension rubber layer, and a reinforcing fabric on an outer peripheral side are wound in this order to obtain an unvulcanized laminate. Thereafter, the mold on which the laminate is mounted is disposed in a vulcanizing device in a state in which the outer peripheral side of the laminate is covered with a jacket, and vulcanization is performed at a temperature of about 120° C. to 200° C. (in particular, 150° C. to 180° C.), whereby the rubber component of each rubber layer is cross-linked and cured, and the laminate is adhered and integrated, thereby preparing a belt sleeve (vulcanized sleeve) in which a cog portion is formed on the inner peripheral side. The obtained vulcanized sleeve is cut into a predetermined width by using a cutter or the like, and the side surface is further cut into a V shape so as to obtain a predetermined V angle, thereby forming the raw edge cogged V-belt 10 in which a cog portion is formed on the inner peripheral side.

As a method for forming the cog portion, as in the method described in JP-A-2018-35939, a belt sleeve (vulcanized sleeve) in which a cog portion is not formed on the inner peripheral side surface may be prepared by using a flat cylindrical mold in which an uneven surface corresponding to a cog shape is not engraved, and then a cog portion may be formed by performing removal processing from the vulcanized sleeve by using a cutting tool, a water jet processing machine, or the like.

<4-2. Second Manufacturing Method>

An unvulcanized laminate is obtained by using, as a mold, a flat cylindrical mold in which an uneven surface corresponding to a cog shape is not engraved, and by winding a reinforcing fabric, an unvulcanized sheet for a tension rubber layer, an unvulcanized sheet for a second adhesion rubber layer (upper adhesion rubber), a cord, an unvulcanized sheet for a first adhesion rubber layer (lower adhesion rubber), and an unvulcanized sheet for a compression rubber layer which has been previously formed into a cog shape, in the reverse order of the first manufacturing method.

The outer peripheral side of the laminate is covered with a cylindrical rubber master mold in which an uneven surface corresponding to a cog shape is formed on the inner peripheral side surface. Then, the resultant is disposed in a vulcanizing device in a state where the outer peripheral side of the rubber master mold is covered with a jacket, and vulcanization is performed at a temperature of about 120° C. to 200° C. (particularly preferably 150° C. to 180° C.), thereby preparing a belt sleeve (a vulcanized sleeve) in which a cog shape is formed on the outer peripheral side. The obtained vulcanized sleeve is cut into a predetermined width by using a cutter or the like, the side surface is further cut into a V shape so as to obtain a predetermined V angle, and then the outer peripheral side and the inner peripheral side are inverted to obtain the raw edge cogged V-belt 10 in which a cog portion is formed on the inner peripheral side.

EXAMPLES

Hereinafter, in order to confirm the effects of the present invention, analysis by a three-dimensional finite element method (FEM) and a belt durability running test were performed. The present invention is not limited to these Examples.

[(1) Analysis by Three-Dimensional Finite Element Method (FEM)]

In the following analysis, a three-dimensional model in which the curvature radius $R_1$ of the first arc 21, the curvature radius $R_2$ of the second arc 22, and the cog angle (one side) θ were changed was created by using the cogged V-belt 10 having a large size and having the belt thickness H of 30 mm and the upper width W of 71 mm (aspect ratio is 2.4), and stress generated in the cog valley 12 was compared and verified by finite element method analysis when the cogged V-belt 10 was bent and a lateral pressure is applied to the contact surface with the pulley.

Figure 4A:
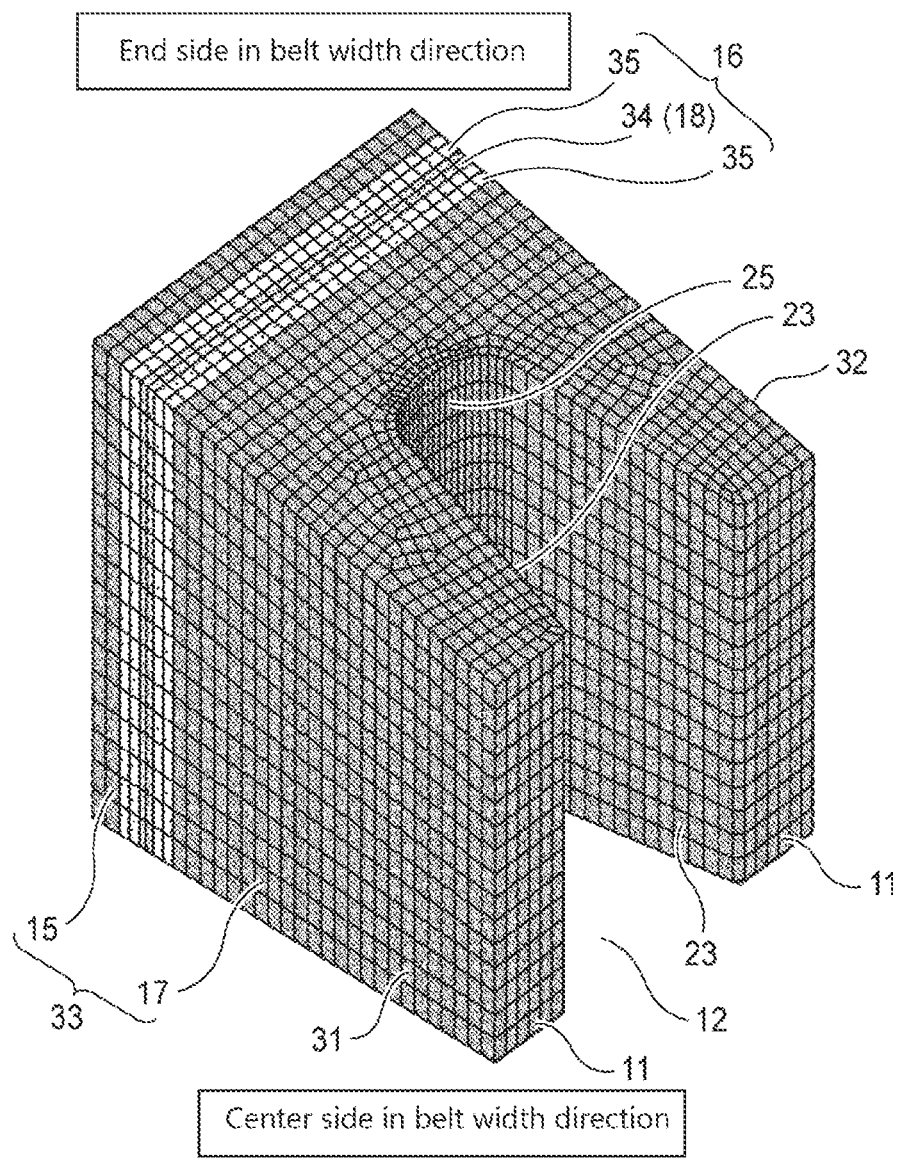
FIG. 4A is an analysis model of a three-dimensional finite element method of the cogged V-belt.

As illustrated in FIG. 4A, the three-dimensional finite element method analysis model of the cogged V-belt 10 includes a rubber portion 33 corresponding to the tension rubber layer 15 and the compression rubber layer 17, and the tension member layer 16 including a cord layer 34 corresponding to the cord 18 and the adhesion rubber layers 35 disposed above and below the cord layer 34.

Figure 4B:
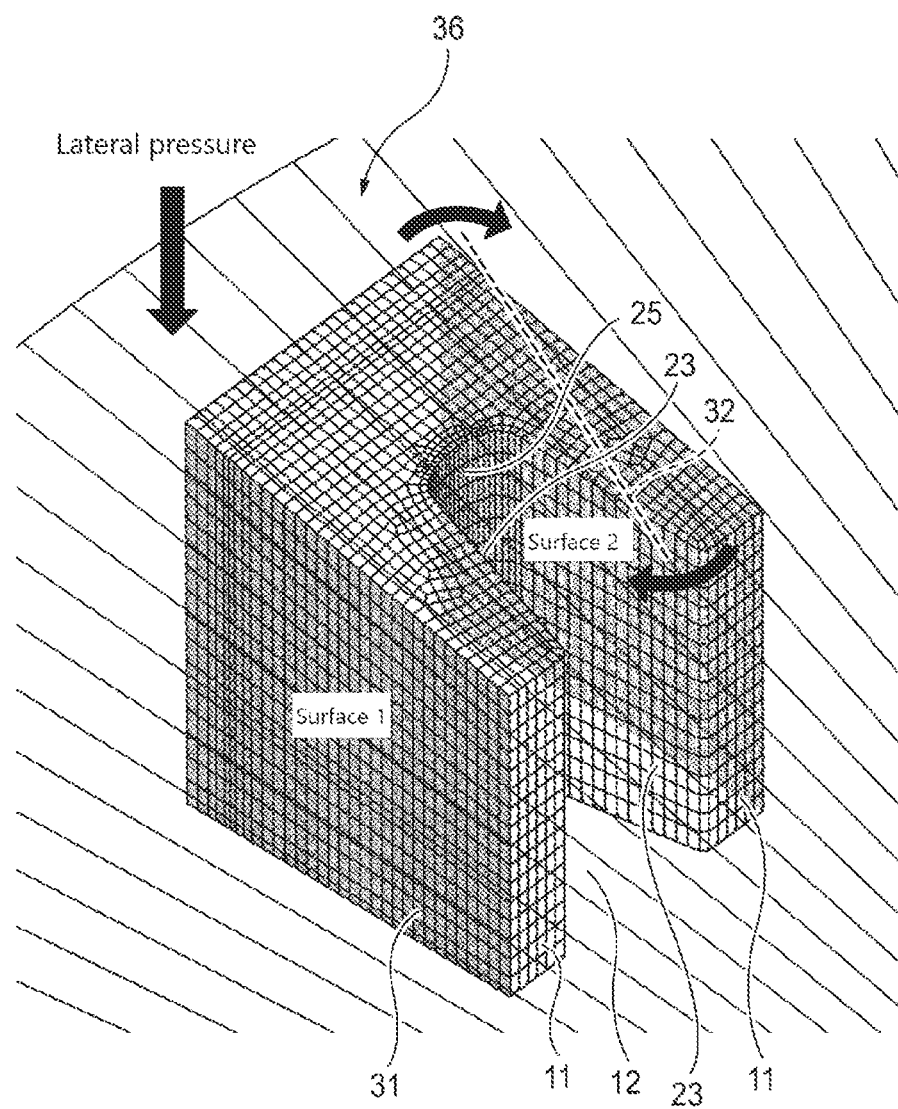
FIG. 4B is a diagram showing a state in which bending and lateral pressure are applied to the cogged V-belt.

This model models one pitch of the cogged V-belt 10, and surfaces (a surface 31 and a surface 32) at both ends thereof are restrained in the plane (see FIG. 4B). In addition, in a width direction of the belt, since the belt is symmetrical with respect to a width center, only half of the belt in the width direction is modeled, and the plane of symmetry is restrained in the plane.

Then, in the model of the cord layer 34, since there is a large difference in rigidity between bending rigidity and tensile rigidity, the rubber portion 33 and the adhesion rubber layer 35 are the same solid element, and in addition, a truss element is disposed in a neutral plane in the thickness direction in the cord layer 34. Accordingly, the bending rigidity is given to the solid element, and the tensile rigidity is given to the truss element.

As illustrated in FIG. 4B, while the one surface 1 (31) is fixed in the plane and the other surface 2 (32) is maintained in a planar state, the cogged V-belt 10 is inclined so as to be bent, and is bent so as to have a predetermined curvature (specifically, such that a pulley pitch diameter during bending (that is, a winding diameter in the cord layer 34 of the belt) is 300 mm in diameter). Further, a pulley surface 36 (rigid body) was disposed on a side surface of the cogged V-belt 10, and a predetermined lateral pressure (14,000 N as a pressing force of the pulley against the belt) was applied to the pulley surface 36 to apply a lateral pressure to the cogged V-belt 10.

Here, as physical property values used for the analysis, the solid element has material characteristics (C10, C01) of Mooney-Rivlin, which is a superelastic material model. The rubber portion was set to C10=1.82 MPa and C01=0.455 MPa, the adhesion rubber layer 35 was set to C10=1.26 MPa and C01=0.314 MPa, and the solid element portion of the cord layer 34 was set to C10=6.67 MPa and C01=1.67 MPa.

In addition, a truss element portion of the cord layer 34 was a linear material model, the Young's modulus was set to 28,929 MPa, the Poisson's ratio was set to 0.3, and the cross-sectional area per linear material on the model was set to 3.14 $mm^2$ (however, that of the cord at the end was set to a half, 1.57 $mm^2$). The FEM analysis was performed, and the stress generated at the deepest portion A of the cog valley 12 was evaluated by the von Mises stress.

Figure 4C:
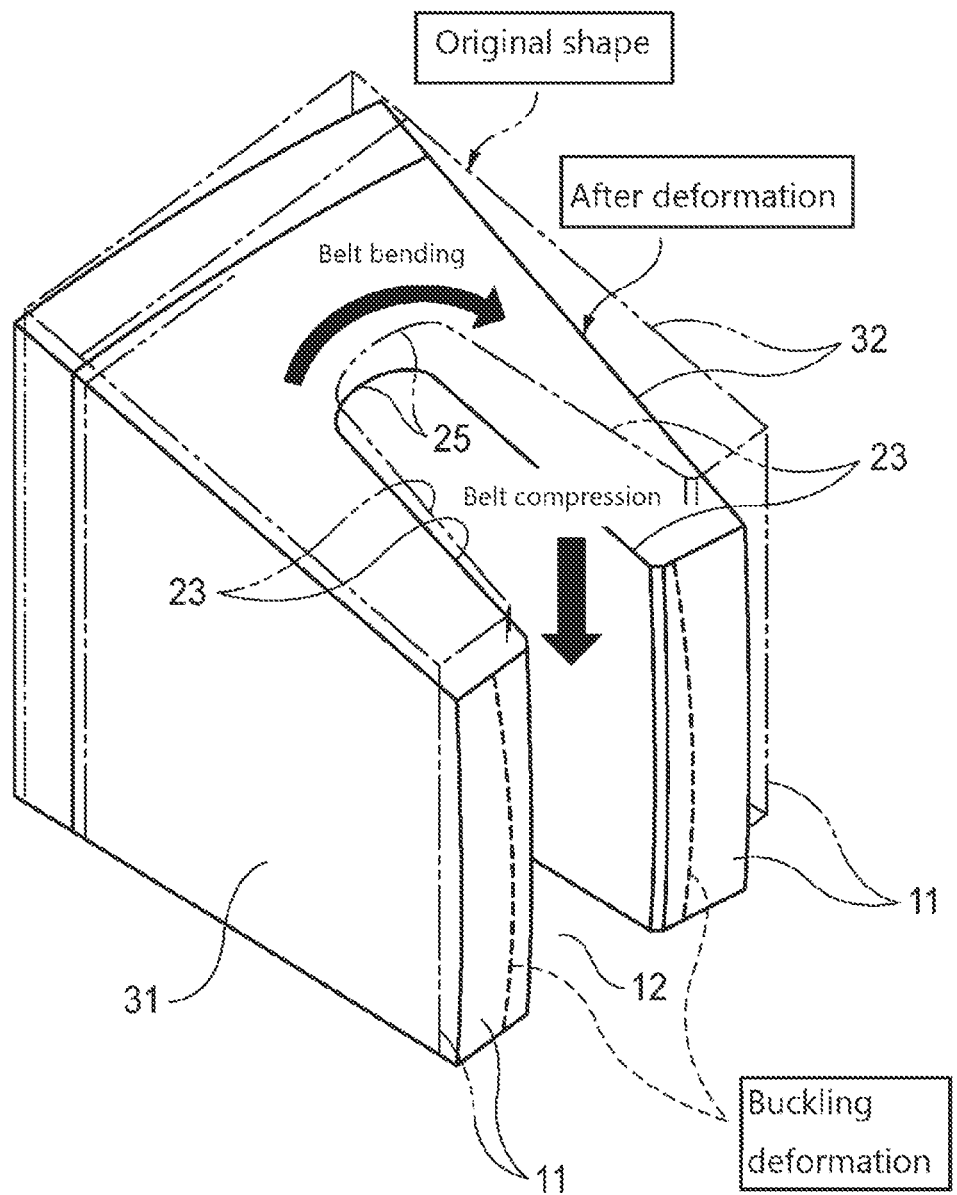
FIG. 4C is a diagram showing an analysis result thereof.

In addition, according to the analysis, as illustrated in FIG. 4C, it was found that when the bending and the lateral pressure simultaneously act on the cogged V-belt 10, the cog ridge 11 slightly causes buckling deformation. In addition, it was found that the stress generated in the cog valley 12 is lowest at an end portion of the cogged V-belt 10 in the width direction, and the von Mises stress exhibits the maximum value at a center portion in the belt width direction. In addition, the cog portion 13 is also compressed in the belt width direction by the lateral pressure from the pulley being applied to the side surface portion of the cogged V-belt 10. As a compression amount of the cog portion 13 in the belt width direction increases, problems such as wear of the cogged V-belt 10 and popping out of the cord 18 tend to occur. In this analysis and evaluation, a belt width reduction rate was used as an index indicating the degree of compression in the belt width direction. The belt width reduction rate is a ratio of the compression amount (which is synonymous with a so-called compression rate) with respect to the upper width W before the lateral pressure from the pulley acts.

(Pass/Fail Determination Criteria of Analysis Result by Finite Element Method)

Regarding the cogged V-belt 10 having various cog shapes verified as Examples and Comparative Examples described below, a three-dimensional finite element model was created and analyzed to calculate a maximum value X of the von Mises stress generated at the deepest portion A of the cog valley 12 and a maximum value Y of the width reduction rate. The smaller the maximum value X of the von Mises stress and the maximum value Y of the width reduction rate, the better, and the superiority or inferiority was determined based on the following criteria.

(Determination Criteria of Maximum Value X of Von Mises Stress)

A: 4.0 MPa or less
B: more than 4.0 MPa and 4.5 MPa or less
C: more than 4.5 MPa (Determination Criteria of Maximum Value Y of Belt Width Reduction Rate)
A: 5.6% or less
B: more than 5.6% and 5.8% or less
C: more than 5.8%

(Verification Result by Finite Element Method Analysis)

Regarding the cogged V-belt 10 of Examples and Comparative Examples subjected to the comparative verification, the specifications of each belt, and the maximum value X of the von Mises stress value generated at the deepest portion A of the cog valley 12 and the maximum value Y of the belt width reduction rate, which are calculated by the finite element method analysis, are shown in the upper sections of Table 1 to Table 6 together with the comprehensive determination results.

Regarding the specifications of each belt, Table 1 to Table 6 show the belt thickness H, the cog height $H_1$, the center-valley thickness $H_2$, the curvature radius $R_1$ of the first arc, the curvature radius $R_2$ of the second arc, the radius $R_0$ of the virtual circle, the cog angle θ, and the cog pitch P. Table 4 to Table 6 further show a ratio $H_2/H$ (%) of the center-valley thickness to the belt thickness, the belt upper width W, and a ratio (W/H) of the upper width to the belt thickness.

The comprehensive determination shown in Table 1 to Table 6 was classified into ranks A to C based on the following criteria.

(Comprehensive Determination)
Rank A: case where both X and Y are determined to be A
Rank B: case where there is no C, but one or both of X and Y are determined to be B
Rank C: case where one or both of X and Y are determined to be C

TABLE 1

| (1) Analysis by three-dimensional finite element method (FEM) | | Comparative Example 1 | Example 1 | Example 2 | Example 3 | Comparative Example 2 |
|---|---|---|---|---|---|---|
| Belt thickness | H (mm) | | | 30 | | |
| Cog height | $H_1$ (mm) | | | 17 | | |
| Center-valley thickness | $H_2$ (mm) | | | 9 | | |
| Curvature radius of arc in cog valley | $R_1$ (mm) | 6.5 | 7.5 | 8.5 | 9.5 | 10.5 |
| | $R_2$ (mm) | | | 2.1 | | |
| Radius of virtual circle | $R_0$ (mm) | | | 4.8 | | |
| Cog angle [one side] | θ (°) | | | 10 | | |
| Cog pitch | P (mm) | | | 26.0 | | |
| Maximum value of von Mises stress generated at deepest portion of cog valley | X (MPa) | 4.6 | 3.9 | 3.9 | 3.3 | 3.1 |
| | Determination | C | A | A | A | A |
| Maximum value of belt width reduction rate | Y (%) | 5.2 | 5.4 | 5.6 | 5.6 | 5.9 |
| | Determination | A | A | A | A | C |
| Comprehensive determination | | Rank C | Rank A | Rank A | Rank A | Rank C |
| (2) Belt durability running test | High load condition | Cord popped out in 24 hours | Completely ran without abnormality | Completely ran without abnormality | Completely ran without abnormality | Cord popped out in 48 hours |
| | High temperature and high speed condition | Cracks were generated at cog valley portion in 48 hours | Completely ran without abnormality | Completely ran without abnormality | Completely ran without abnormality | Completely ran without abnormality |

| (1) Analysis by three-dimensional finite element method (FEM) | | Comparative Example 3 | Comparative Example 4 | Comparative Example 5 | Reference |
|---|---|---|---|---|---|
| Belt thickness | H (mm) | | 30 | | 13.2 |
| Cog height | $H_1$ (mm) | | 17 | | 6.8 |
| Center-valley thickness | $H_2$ (mm) | | 9 | | 3.1 |
| Curvature radius of arc in cog valley | $R_1$ (mm) | 8.5 | 4.0 | 6.4 | 2.8 |
| | $R_2$ (mm) | None | None | 2.3 | 1.0 |
| Radius of virtual circle | $R_0$ (mm) | — | — | — | — |
| Cog angle [one side] | θ (°) | 10 | 17 | 8.5 | 8.5 |

TABLE 1-continued

|  |  |  |  |  |  |
|---|---|---|---|---|---|
| Cog pitch | P (mm) |  | 26.0 |  | 10.3 |
| Maximum value of von Mises stress generated at deepest portion of cog valley | X (MPa) Determination | 4.6 C | 5.8 C | 4.1 B | — |
| Maximum value of belt width reduction rate | Y (%) Determination | 5.6 A | 4.8 A | 7.6 C | — |
| Comprehensive determination |  | Rank C | Rank C | Rank C | — |
| (2) Belt durability running test | High load condition | Cord popped out in 24 hours | Cord popped out in 24 hours | Cord popped out in 1 hour |  |
|  | High temperature and high speed condition | Cracks were generated at cog valley portion in 48 hours | Cracks were generated at cog valley portion in 43 hours | Cracks were generated at cog valley portion in 1 hour |  |

TABLE 2

| (1) Analysis by three-dimensional finite element method (FEM) |  | Example 4 | Example 5 | Example 2 (base) | Example 6 | Example 7 |
|---|---|---|---|---|---|---|
| Belt thickness | H (mm) |  |  | 30 |  |  |
| Cog height | $H_1$ (mm) |  |  | 17 |  |  |
| Center-valley thickness | $H_2$ (mm) |  |  | 9 |  |  |
| Curvature radius of arc in cog valley | $R_1$ (mm) |  |  | 8.5 |  |  |
|  | $R_2$ (mm) | 1.5 | 1.8 | 2.1 | 2.5 | 2.8 |
| Radius of virtual circle | $R_0$ (mm) |  |  | 4.8 |  |  |
| Cog angle [one side] | θ (°) |  |  | 10 |  |  |
| Cog pitch | P (mm) |  |  | 26.0 |  |  |
| Maximum value of von Mises stress generated at deepest portion of cog valley | X (MPa) Determination | 3.5 A | 3.7 A | 3.9 A | 4.0 A | 4.3 B |
| Maximum value of belt width reduction rate | Y (%) Determination | 5.7 B | 5.6 A | 5.6 A | 5.6 A | 5.5 A |
| Comprehensive determination |  | Rank B | Rank A | Rank A | Rank A | Rank B |
| (2) Belt durability running test | High load condition | Cord popped out in 120 hours | Completely ran without abnormality | Completely ran without abnormality | Completely ran without abnormality | Cord popped out in 100 hours |
|  | High temperature and high speed condition | Completely ran without abnormality | Completely ran without abnormality | Completely ran without abnormality | Completely ran without abnormality | Cracks are generated at cog valley portion in 120 hours |

TABLE 3

| (1) Analysis by three-dimensional finite element method (FEM) |  | Example 8 | Example 2 (base) | Example 9 |
|---|---|---|---|---|
| Belt thickness | H (mm) |  | 30 |  |
| Cog height | $H_1$ (mm) |  | 17 |  |
| Center-valley thickness | $H_2$ (mm) |  | 9 |  |
| Curvature radius of | $R_1$ (mm) | 7.5 | 8.5 | 9.5 |

TABLE 3-continued

| (1) Analysis by three-dimensional finite element method (FEM) | | Example 8 | Example 2 (base) | Example 9 |
|---|---|---|---|---|
| arc in cog valley | $R_2$ (mm) | 1.8 | 2.1 | 2.5 |
| Radius of virtual circle | $R_0$ (mm) | | 4.8 | |
| Cog angle [one side] | $\theta$ (°) | | 10 | |
| Cog pitch | P (mm) | | 26.0 | |
| Maximum value of von Mises stress generated at deepest portion of cog valley | X (MPa) | 3.9 | 3.9 | 3.3 |
| | Determination | A | A | A |
| Maximum value of belt width reduction rate | Y (%) | 5.6 | 5.6 | 5.6 |
| | Determination | A | A | A |
| Comprehensive determination | | Rank A | Rank A | Rank A |
| (2) Belt durability running test | High load condition | Completely ran without abnormality | Completely ran without abnormality | Completely ran without abnormality |
| | High temperature and high speed condition | Completely ran without abnormality | Completely ran without abnormality | Completely ran without abnormality |

TABLE 4

| (1) Analysis by three-dimensional finite element method (FEM) | | Example 10 | Example 2 (base) | Example 11 |
|---|---|---|---|---|
| Belt thickness | H (mm) | | 30 | |
| Cog height | $H_1$ (mm) | | 17 | |
| Center-valley thickness | $H_2$ (mm) | 7 | 9 | 11 |
| Ratio of center-valley thickness to belt thickness | $H_2/H$ (%) | 23 | 30 | 37 |
| Belt upper width | W (mm) | | 71 | |
| Ratio of upper width to belt thickness (aspect ratio) | W/H | | 2.4 | |
| Curvature radius of arc in cog valley | $R_1$ (mm) | | 8.5 | |
| | $R_2$ (mm) | | 2.1 | |
| Radius of virtual circle | $R_0$ (mm) | | 4.8 | |
| Cog angle [one side] | $\theta$ (°) | | 10 | |
| Cog pitch | P (mm) | | 26.0 | |
| Maximum value of von Mises stress generated at deepest portion of cog valley | X (MPa) | 3.7 | 3.9 | 4.0 |
| | Determination | A | A | A |
| Maximum value of belt width reduction rate | Y (%) | 5.6 | 5.6 | 5.1 |
| | Determination | A | A | A |
| Comprehensive determination | | Rank A | Rank A | Rank A |
| (2) Belt durability running test | High load condition | Completely ran without abnormality | Completely ran without abnormality | Completely ran without abnormality |
| | High temperature and high speed condition | Completely ran without abnormality | Completely ran without abnormality | Completely ran without abnormality |

TABLE 5

| (1) Analysis by three-dimensional finite element method (FEM) | | Example 12 | Example 13 | Example 14 |
|---|---|---|---|---|
| Belt thickness | H (mm) | | 27 | |
| Cog height | $H_1$ (mm) | | 14 | |
| Center-valley thickness | $H_2$ (mm) | 5 | 6 | 8 |
| Ratio of center-valley thickness to belt thickness | $H_2/H$ (%) | 19 | 22 | 30 |
| Belt upper width | W (mm) | | 44 | |
| Ratio of upper width to belt thickness (aspect ratio) | W/H | | 1.6 | |
| Curvature radius of arc in cog valley | $R_1$ (mm) | | 8.5 | |
| | $R_2$ (mm) | | 2.1 | |
| Radius of virtual circle | $R_0$ (mm) | | 4.8 | |
| Cog angle [one side] | $\theta$ (°) | | 10 | |
| Cog pitch | P (mm) | | 26.0 | |

TABLE 5-continued

| (1) Analysis by three-dimensional finite element method (FEM) | | Example 12 | Example 13 | Example 14 |
|---|---|---|---|---|
| Maximum value of von Mises stress generated at deepest portion of cog valley | X (MPa) | 3.5 | 3.6 | 3.9 |
| | Determination | A | A | A |
| Maximum value of belt width reduction rate | Y (%) | 5.8 | 5.6 | 5.2 |
| | Determination | B | A | A |
| Comprehensive determination | | Rank B | Rank A | Rank A |
| (2) Belt durability running test | High load condition | Cord popped out in 120 hours | Completely ran without abnormality | Completely ran without abnormality |
| | High temperature and high speed condition | Completely ran without abnormality | Completely ran without abnormality | Completely ran without abnormality |

TABLE 6

| (1) Analysis by three-dimensional finite element method (FEM) | | Example 15 | Example 16 | Example 17 |
|---|---|---|---|---|
| Belt thickness | H (mm) | | 36 | |
| Cog height | $H_1$ (mm) | | 19 | |
| Center-valley thickness | $H_2$ (mm) | 10 | 13 | 15 |
| Ratio of center-valley thickness to belt thickness | $H_2/H$ (%) | 28 | 36 | 42 |
| Belt upper width | W (mm) | | 77 | |
| Ratio of upper width to belt thickness (aspect ratio) | W/H | | 2.1 | |
| Curvature radius of arc in cog valley | $R_1$ (mm) | | 8.5 | |
| | $R_2$ (mm) | | 2.1 | |
| Radius of virtual circle | $R_0$ (mm) | | 4.8 | |
| Cog angle [one side] | θ (°) | | 10 | |
| Cog pitch | P (mm) | | 26.0 | |
| Maximum value of von Mises stress generated at deepest portion of cog valley | X (MPa) | 3.8 | 4.0 | 4.4 |
| | Determination | A | A | B |
| Maximum value of belt width reduction rate | Y (%) | 5.4 | 5.1 | 4.8 |
| | Determination | A | A | A |
| Comprehensive determination | | Rank A | Rank A | Rank B |
| (2) Belt durability running test | High load condition | Completely ran without abnormality | Completely ran without abnormality | Cord popped out in 120 hours |
| | High temperature and high speed condition | Completely ran without abnormality | Completely ran without abnormality | Cracks were sgenerated at cog valley portion in 100 hours |

(Description of Table 1)

Table 1 shows the maximum value X (MPa) of the von Mises stress generated at the deepest portion A of the cog valley 12 and the belt width reduction rate Y (%) when the curvature radius $R_1$ of the first arc 21, the curvature radius $R_2$ of the second arc 22, and the cog angle θ were changed in the raw edge cogged V-belt 10 in which the belt thickness H=30 mm, the cog height $H_1$=17 mm, the center-valley thickness $H_2$=9 mm, and the cog pitch P=26.0 mm in both Examples and Comparative Examples, together with the comprehensive determination result.

Table 1 shows the analysis results of the maximum value X of the von Mises stress generated at the deepest portion A of the cog valley 12 and the maximum value Y of the belt width reduction rate when $R_1$ was changed, with respect to the belt of Example 1 in which both the maximum value X of the von Mises stress and the maximum value Y of the belt width reduction rate were determined to be A, and the comprehensive determination was rank A. In both cases of $R_1$=8.5 mm (Example 2) and $R_1$=9.5 mm (Example 3) in which the curvature radius $R_1$ of the first arc 21 satisfies the numerical value range ($R_1$: 7 to 10 mm) defined in the present invention, the comprehensive determination was rank A as in Example 1.

On the other hand, in Comparative Example 1 ($R_1$=6.5 mm) in which the curvature radius $R_1$ was smaller than the numerical value range defined in the present invention, the maximum value X of the von Mises stress was large, and thus the comprehensive determination was rank C. In addition, in Comparative Example 2 ($R_1$=10.5 mm) in which the curvature radius $R_1$ was larger than the numerical value range defined in the present invention, the maximum value Y of the belt width reduction rate was large, and thus the comprehensive determination was rank C. In addition, even when the curvature radius $R_1$ was 8.5 mm which was the same as that of Example 2, in Comparative Example 3 in which the curvature radius $R_2$ was not provided, since the maximum value X of the von Mises stress was large, the comprehensive determination was rank C.

Comparative Example 4 is an example in which the curvature radius $R_1$ is extremely smaller than that of Example 2, and is an example in which the deepest portion A of the cog valley 12 is not in an arc shape but substantially in a shape close to the top portion of a triangle. In Comparative Example 4, since the contact area with the pulley was increased, the belt width reduction rate (lateral pressure resistance) was excellent. On the other hand, since the maximum value X of the von Mises stress was extremely increased, the comprehensive determination was rank C.

Comparative Example 5 is a raw edge cogged V-belt in which the contour shape of the cog portion of the raw edge cogged V-belt described in Example of Patent Literature 1 is maintained as it is, and the dimensions of each portion are enlarged in a similar shape (proportionally calculated in the thickness direction) so as to be a large-sized belt (belt thickness H=30.0 mm) targeted in the present invention.

That is, the raw edge cogged V-belt described in Example of Patent Literature 1 has a dimension classified into a small size, and specifically, has dimensions of each portion described as "Reference" in Table 1 (that is, the belt thickness H is 13.2 mm, the cog height $H_1$ is 6.8 mm, the center-valley thickness $H_2$ is 3.1 mm, the curvature radius $R_1$ of the arc at the deepest portion of the cog valley is 2.8 mm, and $R_2$ is 1.0 mm).

Regarding the small-sized cogged V-belt, the contour shape of the cog portion was maintained as it is (that is, diverted) and the dimensions of each portion were enlarged in a similar shape (enlargement ratio: 30/13.2=about 2.272 times) so as to become a large-sized belt (thickness H=30.0 mm) targeted in the present invention, and the thus obtained raw edge cogged V-belt was defined as Comparative Example 5. As a result of the similarity enlargement, $R_1$=about 6.4 mm and $R_2$=about 2.3 mm.

In addition, the cog height $H_1$ and the center-valley thickness $H_2$ are not directly related to the maintenance of the contour shape, and therefore, were not included in the target of similarity enlargement. That is, the cog height $H_1$ and the center-valley thickness Hz were set to $H_1$=17 mm and $H_2$=9 mm, respectively, as in Examples, for comparison with Examples. Further, the cog angle θ was set to 8.5° as in "Reference", and the cog pitch P was set to 26.0 mm as in Examples. In addition, the cog ridge was formed in an arc shape similarly to the belt of Patent Literature 1.

In Comparative Example 5, the maximum value X of the von Mises stress was slightly decreased, but the maximum value Y of the belt width reduction rate was extremely increased, and therefore, the comprehensive determination was rank C. In Comparative Example 5, the determination result of the maximum value Y of the belt width reduction rate was significantly different from that of Comparative Example 1, although the dimensions of each portion of the belt were similar to those of Comparative Example 1. It is considered that this is because the cog ridge of Comparative Example 1 is formed by a straight line, whereas the cog ridge of Comparative Example 5 is formed by an arc and the area of the frictional power transmission surface is small.

(Description of Table 2)

Table 2 shows the results obtained by analyzing the maximum value X of the von Mises stress generated at the deepest portion A of the cog valley 12 and the maximum value Y of the belt width reduction rate when the curvature radius $R_2$ of the second arc 22 was changed with the curvature radius $R_1$ of the first arc 21 being constant at 8.5 mm based on the raw edge cogged V-belt 10 of Example 2.

Both cases where the curvature radius $R_2$ of the second arc 22 was 1.8 mm (Example 5) and 2.5 mm (Example 6) satisfied the preferable numerical value range ($R_2$: 1.8 to 2.5 mm) defined in the present invention, and therefore, both of the maximum value X of the von Mises stress and the maximum value Y of the belt width reduction rate were determined to be A, and the comprehensive determination was rank A.

On the other hand, in the case where the curvature radius $R_2$ was as small as 1.5 mm (Example 4), the maximum value Y of the belt width reduction rate is somewhat large, and was determined to be B, and thus the comprehensive determination was rank B. In addition, in the case where the curvature radius $R_2$ was as large as 2.8 mm (Example 7), the maximum value X of the von Mises stress was somewhat large, and was determined to be B, and thus the comprehensive determination was rank B.

(Description of Table 3)

Table 3 shows the results obtained by analyzing the maximum value X of the von Mises stress generated at the deepest portion A of the cog valley 12 and the maximum value Y of the belt width reduction rate when both the curvature radius $R_1$ of the first arc 21 and the curvature radius $R_2$ of the second arc were changed based on the raw edge cogged V-belt 10 of Example 2.

Both of Example 8 (curvature radius $R_1$=7.5 mm, curvature radius $R_2$=1.8 mm) and Example 9 (curvature radius $R_1$=9.5 mm, curvature radius $R_2$=2.5 mm) satisfied the numerical value range ($R_1$: 7 to 10 mm) defined in the present invention and the preferred numerical value range ($R_2$: 1.8 to 2.5 mm) defined in the present invention, and therefore, both of the maximum value X of the von Mises stress and the maximum value Y of the belt width reduction rate were determined to be A. and the comprehensive determination was rank A.

(Description of Table 4)

Table 4 shows the results obtained by analyzing the maximum value X of the von Mises stress generated at the deepest portion A of the cog valley 12 and the maximum value Y of the belt width reduction rate when the center-valley thickness $H_2$ was changed based on the raw edge cogged V-belt 10 of Example 2.

Both of Example 10 (center-valley thickness $H_2$=7 mm, $H_2$/H=23%) and Example 11 (center-valley thickness $H_2$=11 mm, $H_2$/H=37%) satisfied the preferable numerical value ranges ($H_2$=6 to 13 mm, $H_2$/H=20 to 40%) defined in the present invention, and therefore, both of the maximum value X of the von Mises stress and the maximum value Y of the belt width reduction rate were determined to be A, and the comprehensive determination was rank A.

(Description of Table 5)

Table 5 shows the results obtained by analyzing the maximum value X of the von Mises stress generated at the deepest portion A of the cog valley 12 and the maximum value Y of the belt width reduction rate in the case where the center-valley thickness $H_2$ was changed in the raw edge cogged V-belt 10 slightly smaller (belt thickness H=27 mm, belt upper width W=44 mm) than the raw edge cogged V-belt 10 of Examples 1 to 11 in order to confirm the tendency when the center-valley thickness $H_2$ is further reduced.

Both of Example 14 (center-valley thickness $H_2$=8 mm, $H_2$/H=30%) and Example 13 (center-valley thickness $H_2$=6 mm, $H_2$/H=22%) satisfied the preferable numerical value ranges ($H_2$=6 to 13 mm, $H_2$/H=20 to 40%) defined in the present invention, and therefore, both of the maximum value X of the von Mises stress and the maximum value Y of the belt width reduction rate were determined to be A, and the comprehensive determination was rank A.

On the other hand, in Example 12 (center-valley thickness $H_2$=5 mm, $H_2$/H=19%), the maximum value Y of the belt width reduction rate was somewhat large, and was determined to be B, and thus the comprehensive determination was rank B.

(Description of Table 6)

Table 6 shows the results obtained by analyzing the maximum value X of the von Mises stress generated at the deepest portion A of the cog valley 12 and the maximum value Y of the belt width reduction rate in the case where the center-valley thickness $H_2$ was changed in the raw edge cogged V-belt 10 larger (belt thickness H=36 mm, belt upper width W=77 mm) than the raw edge cogged V-belt 10 of Examples 1 to 11 in order to confirm the tendency when the center-valley thickness $H_2$ is further increased.

Both of Example 15 (center-valley thickness $H_2$=10 mm, $H_2/H$=28%) and Example 16 (center-valley thickness $H_2$=13 mm, $H_2/H$=36%) satisfied the preferable numerical value ranges ($H_2$=6 to 13 mm, $H_2/H$=20 to 40%) defined in the present invention, and therefore, both of the maximum value X of the von Mises stress and the maximum value Y of the belt width reduction rate were determined to be A. and the comprehensive determination was rank A.

On the other hand, in Example 17 (center-valley thickness $H_2$=15 mm, $H_2/H$=42%), the maximum value X of the von Mises stress was somewhat large, and was determined to be B, and thus the comprehensive determination was rank B.

Therefore, the following can be said from the results of the comparative verification shown in Tables 1 to 3 by the finite element method (FEM) analysis. In the case where the curvature radius $R_1$ of the arc (first arc 21) of the deepest portion A of the cog valley 12 is 7 to 10 mm (7.5 to 9.5 mm in experimental data), and the curvature radius $R_2$ of the arc (second arc 22) continuously connected to both sides from the deepest portion A of the cog valley 12 is smaller than $R_1$, preferably is 1.8 to 2.5 mm, the stress generated at the deepest portion A of the cog valley 12 during the belt bending is reduced, the lateral pressure resistance is ensured, and the belt width reduction rate is reduced.

In the cogged V-belt 10 of Comparative Example 5 ($R_1$=6.4 mm, $R_2$=2.3 mm) in which the contour shape of the cog portion 13 is maintained as it is and the dimensions of each portion are simply enlarged in a similar shape (proportionally calculated in the thickness direction) with respect to the small-sized cogged V-belt of Patent Literature 1 shown as the reference, the maximum value X of the von Mises stress generated at the deepest portion A of the cog valley 12 is slightly small at 4.1 MPa, whereas the maximum value Y of the belt width reduction rate is large at 7.6%. That is, although the belt of Comparative Example 5 has the effect of reducing the stress during bending, since the contact area with the pulley cannot be sufficiently ensured, the belt lacks the lateral pressure resistance sufficient to withstand the level of the load of the power transmission mechanism in a large-sized (large-scale) use environment.

Accordingly, by simply applying the cog shape described in Patent Literature 1 or Patent Literature 2, which is not assumed to be applied to a large-sized (large-scale) use environment, to be enlarged in a similar manner, it is not possible to ensure the lateral pressure resistance or the transmission force necessary for the level of the load of the power transmission mechanism in the large-sized (large-scale) use environment. Therefore, it can be said that it is necessary to design a product such that each condition of the present invention is satisfied depending on the use environment.

In addition, from the comparison results shown in Table 4 to Table 6, in the cogged V-belt in which the curvature radius $R_1$ of the arc (the first arc 21) of the deepest portion A of the cog valley 12 is 7 to 10 mm and the curvature radius $R_2$ of the arc (the second arc 22) continuously connected to both sides from the deepest portion A of the cog valley 12 is smaller than $R_1$, when the center-valley thickness $H_2$ is 6 to 13 mm and the ratio of the center-valley thickness $H_2$ to the belt thickness H is 20 to 40%, in particular, the stress generated at the deepest portion A of the cog valley 12 during the belt bending is reduced, the lateral pressure resistance is ensured, and the belt width reduction rate is further reduced.

[(2) Belt Durability Running Test]

As cogged V-belts having a large size (belt thickness H=19 to 36 mm), raw edge cogged V-belts having the cog shapes of Examples and Comparative Examples (Examples 1 to 17 and Comparative Examples 1 to 5) shown in [(1) Analysis by Three-Dimensional Finite Element Method (FEM)] in the raw edge cogged V-belt having the belt thickness H=30 mm in which the cog portion 13 was formed on the belt inner peripheral side $10_i$, were prepared, and the durability was compared and verified by performing the durability running test on each belt.

The details of the belt materials used in Examples and Comparative Examples of the belt durability running test are shown below.

(Sheet for Rubber Layer)

An unvulcanized sheet for a compression rubber layer, an unvulcanized sheet for a tension rubber layer, and an unvulcanized sheet for an adhesion rubber layer were prepared by a method of respectively kneading a rubber composition A for the compression rubber layer and the tension rubber layer, and a rubber composition B for the adhesion rubber layer by using a Banbury mixer, and then rolling the kneaded rubber through a calendar roll. The compositions of the rubber compositions of the compression rubber layer, the tension rubber layer, and the adhesion rubber layer are shown in Table 7.

TABLE 7

| | Compression rubber layer and tension rubber layer Rubber composition A | Adhesion rubber layer (first and second) Rubber composition B |
|---|---|---|
| EPDM | 100 | 100 |
| Aramid short fiber | 20 | — |
| Naphthenic oil | 5 | 5 |
| Silica | — | 20 |
| Carbon black HAF | 50 | 30 |
| Zinc oxide | 5 | 5 |
| Anti-aging agent | 4 | 2 |
| Vulcanization accelerator DM | 1.5 | — |
| Vulcanization accelerator TT | 1.5 | 1 |
| Vulcanization accelerator CZ | 1 | 1 |
| Sulfur | 1 | 1 |
| Total | 189 | 165 |

(unit: parts by mass)

[Material in Use]

EPDM. "NORDEL (registered trademark) IP4640" manufactured by Dow DuPont, ethylene content; 55% by mass, ethylidene norbornene content; 4.9% by mass Aramid short fiber: "TOWALON (registered trademark)" manufactured by Teijin Co., Ltd., modulus: 88 cN, fineness: 2.2 dtex, fiber length: 3 mm Naphthenic oil: "Diana (registered trademark) process oil NS-90S" manufactured by Idemitsu Kosan Co., Ltd.

Carbon black HAF: "SEAST (registered trademark) 3" manufactured by Tokai Carbon Co., Ltd.

Anti-aging agent: "Nocrac (registered trademark) AD-F" manufactured by Ouchi Shinko Chemical Industrial Co., Ltd.

Vulcanization accelerator DM: "Nocceler (registered trademark) DM" manufactured by Ouchi Shinko Chemical Industrial Co., Ltd.

Vulcanization accelerator TT: "Nocceler (registered trademark) TT" manufactured by Ouchi Shinko Chemical Industrial Co. Ltd.

Vulcanization accelerator CZ: "Nocceler (registered trademark) CZ" manufactured by Ouchi Shinko Chemical Industrial Co., Ltd.

Silica: "ULTRASIL (registered trademark) VN3" manufactured by Evonik Japan Ltd., BET specific surface area: 175 m²/g (Cord)

Two bundles of multi-filaments of aramid fibers having a fineness of 1.680 dtex were aligned and subjected to primary twist, and three bundles of the resultant were combined and subjected to secondary twist in the direction opposite to that of the primary twist to form a plied cord having a total fineness of 10,080 dtex (average cord diameter: 1.81 mm), which was further subjected to an adhesion treatment to prepare a treated cord.

(Reinforcing Fabric)

A woven fabric of blended yarns of polyester fibers and cotton (polyester fiber/cotton=50/50 mass ratio) (120° wide angle weave, fineness: 20 count warp yarns and 20 count weft yarns, yarn density of warp yarns and weft yarns: 75 yarns/50 mm, basis weight amount: 280 g/m²) was subjected to a coating treatment by a method of simultaneously passing the woven fabric and the pre-kneaded rubber composition B through a calender roll to laminate and adhere the rubber composition B to the woven fabric, thereby preparing a reinforcing fabric precursor.

(Preparation of Cogged V-Belt)

Row edge cogged V-belts 10A having the cog shapes of Examples 1 to 17 and Comparative Examples 1 to 5 were prepared by the manufacturing method described in <4-2. Second Manufacturing Method> above by using each of the above materials.

Vulcanization was performed at 180° C. for 30 minutes to prepare a belt sleeve (vulcanized sleeve) in which a predetermined cog portion was formed on the outer peripheral side, and the obtained vulcanized sleeve was cut into a width of 71 mm by a cutter, and the side surface was further cut into a V shape at a V angle of 28°. Then, the inner peripheral side and the outer peripheral side were inverted to obtain a test raw edge cogged V-belt 10A having a peripheral length of 2,610 mm in which a cog portion was formed on the inner peripheral side.

(Durability Running Test)

The durability running test was performed under the following two conditions of a high load condition and a high temperature and high speed condition.

<Durability Running Under High Load Condition>

Figure 5A:
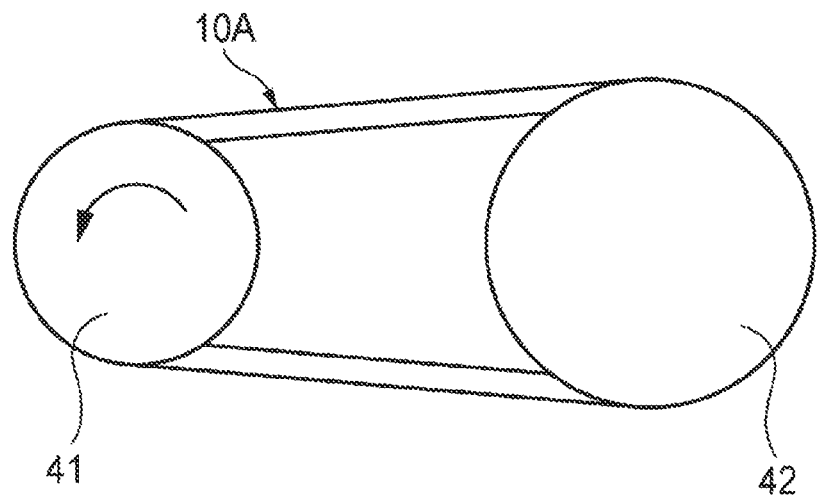
FIG. 5A is a schematic view of a first biaxial running tester in which a diameter of a driven pulley is larger than a diameter of a driving pulley.

As illustrated in FIG. 5A, a biaxial running tester including a driving pulley 41 having a diameter of 275.7 mm and a driven pulley 42 having a diameter of 413.5 mm was used. The test raw edge cogged V-belt 10A was hung on each of the pulleys 41 and 42, the driving pulley 41 was rotated at a rotation speed of 900 rpm, a load of 1,191 N·m was applied to the driven pulley 42, the belt was caused to run at a room temperature for 170 hours, and then, the side surface of the belt (the surface in contact with the pulley) was visually observed with the lapse of time, and the presence or absence of an abnormality such as a crack or separation (popping out) of the cord was confirmed.

<Durability Running Under High Temperature and High Speed Condition>

Figure 5B:
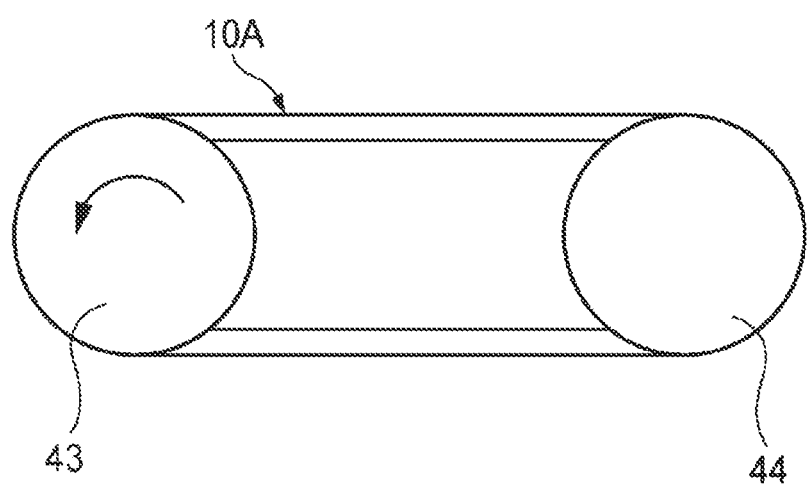
FIG. 5B is a schematic view of a second biaxial running tester in which diameters of a driving pulley and a driven pulley are the same.

As illustrated in FIG. 5B, a biaxial running tester including a driving pulley 43 having a diameter of 244.8 mm and a driven pulley 44 having a diameter of 244.8 mm was used. The test raw edge cogged V-belt 10A was hung on each of the pulleys 43 and 44, the driving pulley 43 was rotated at a rotation speed of 1,317 rpm, a load of 246 N·m was applied to the driven pulley 44, the belt was caused to run at an atmospheric temperature of 60° C. for 380 hours, and then, the side surface of the belt (the surface in contact with the pulley) was visually observed with the lapse of time, and the presence or absence of an abnormality such as a crack or separation (popping out) of the cord was confirmed.

The test results of the durability running tests are shown in the lower sections of Tables 1 to 6.

First, the results shown in Table 1 will be considered.

As for the raw edge cogged V-belt 10A of Comparative Example 1, in the durability running test under the high load condition, the cord popped out (separated) from the side surface of the belt (the surface in contact with the pulley) at the stage of running for 24 hours before cracks were generated at the deepest portion of the cog valley, and it reached the end of the life. In addition, in the durability running test under the high temperature and high speed condition, cracks were generated at the deepest portion of the cog valley at the stage of running for 48 hours, and it reached the end of the life.

These abnormalities are considered to be caused by insufficient bendability (stress concentration due to bending) due to the curvature radius $R_1$ being smaller than the numerical value range defined in the present invention. While a series of operations (bending deformation) of bending and releasing the belt before and after winding around the pulley is continuously repeated, in the case where the shape is such that the deformation stress is likely to be concentrated on the deepest portion of the cog valley, cracks occur in the deepest portion of the cog valley on which the stress is concentrated. In addition, it is considered that the curing of the rubber due to the heat generation caused by the deformation causes cracks in an adhesion interface between the cord and the rubber layer to cause interface peeling, thereby leading to the cord popping out.

As for the raw edge cogged V-belt 10A of Comparative Example 2, in the durability running test under the high load condition, the cord popped out (separated) from the side surface of the belt (the surface in contact with the pulley) at the stage of running for 48 hours before cracks were generated at the deepest portion of the cog valley, and it reached the end of the life. On the other hand, in the durability running test under the high temperature and high speed condition, the belt had completed the durability running test without any abnormalities such as cracks.

It is considered that the abnormality under the high load condition as described above is caused by the fact that, as the curvature radius $R_1$ is larger than the numerical value range defined in the present invention, and thus the determination of the maximum value Y of the belt width reduction rate (an index indicating the degree of compression in the width direction) in the finite element method analysis is C and the comprehensive determination is rank C, the compression amount of the cog portion in the belt width direction is large, the stress is concentrated due to the buckling deformation from the lateral pressure, which causes cracks in the adhesion interface between the cord and the rubber layer to cause interface peeling, thereby leading to the cord popping out.

As for the raw edge cogged V-belt 10A of Comparative Example 3, in the durability running test under the high load condition, the cord popped out (separated) from the side surface of the belt (the surface in contact with the pulley) at the stage of running for 24 hours before cracks were generated at the deepest portion of the cog valley, and it reached the end of the life. In addition, in the durability running test under the high temperature and high speed condition, cracks were generated at the deepest portion of the cog valley at the stage of running for 48 hours, and it reached the end of the life.

These abnormalities are considered to be caused by insufficient bendability (stress concentration due to bending) due to the absence of the curvature radius $R_2$. While a series of operations (bending deformation) of bending and releasing the belt before and after winding around the pulley is continuously repeated, in the case where the shape is such that the deformation stress is likely to be concentrated on the deepest portion of the cog valley, cracks occur in the deepest portion of the cog valley on which the stress is concentrated. In addition, it is considered that the curing of the rubber due to the heat generation caused by the deformation causes cracks in an adhesion interface between the cord and the rubber layer to cause interface peeling, thereby leading to the cord popping out.

As for the raw edge cogged V-belt 10A of Comparative Example 4, in the durability running test under the high load condition, the cord popped out (separated) from the side surface of the belt (the surface in contact with the pulley) at the stage of running for 24 hours before cracks were generated at the deepest portion of the cog valley, and it reached the end of the life. In addition, in the durability running test under the high temperature and high speed condition, cracks were generated at the deepest portion of the cog valley at the stage of running for 43 hours, and it reached the end of the life.

These abnormalities are considered to be caused by insufficient bendability (stress concentration due to bending) due to the deepest portion of the cog valley not having an arc shape. While a series of operations (bending deformation) of bending and releasing the belt before and after winding around the pulley is continuously repeated, in the case where the shape is such that the deformation stress is likely to be concentrated on the deepest portion of the cog valley, cracks occur in the deepest portion of the cog valley on which the stress is concentrated. In addition, it is considered that the curing of the rubber due to the heat generation caused by the deformation causes cracks in an adhesion interface between the cord and the rubber layer to cause interface peeling, thereby leading to the cord popping out.

As for the raw edge cogged V-belt 10A of Comparative Example 5, in the durability running test under the high load condition, the cord popped out (separated) from the side surface of the belt (the surface in contact with the pulley) at the stage of running for 1 hours before cracks were generated at the deepest portion of the cog valley, and it reached the end of the life. In addition, in the durability running test under the high temperature and high speed condition, cracks were generated at the deepest portion of the cog valley at the stage of running for 1 hours, and it reached the end of the life.

Comparative Example 5 is a result of a raw edge cogged V-belt in which the contour shape of the cog portion of the raw edge cogged V-belt described in Example of Patent Literature 1 is maintained as it is, and the dimensions of each portion are enlarged in a similar shape so as to be a large-sized belt targeted in the present invention. As the comprehensive determination was rank C since the determination of the maximum value Y of the belt width reduction rate in the finite element method analysis was C, it is considered that the cog ridge is formed of an arc without a straight line and thus the area of the frictional power transmission surface is small, and therefore, the compression amount of the cog portion in the belt width direction is large, and the stress is concentrated due to the buckling deformation from the lateral pressure, which causes the cord popping out or cracks at the deepest portion of the cog valley portion at an early stage.

On the other hand, as for the raw edge cogged V-belts 10A of Examples 1 to 3 in which the deepest portion of the cog valley had an arc shape having an appropriate curvature radius, as the comprehensive determination was rank A in the finite element method analysis, even in the durability running test, the belts had completed the durability running test without any abnormalities such as cracks or the cord popping out.

Next, the results of Tables 2 to 6 will be considered.

First, as for the raw edge cogged V-belts 10A of Example 4 shown in Table 2 and Example 12 shown in Table 5, in the durability running test under the high load condition, the cord popped out (separated) from the side surface of the belt (the surface in contact with the pulley) at the stage of running for 120 hours before cracks were generated at the deepest portion of the cog valley, and it reached the end of the life. On the other hand, in the durability running test under the high temperature and high speed condition, the belts had completed the durability running test without any abnormalities such as cracks.

The reason why the belts did not run completely without abnormality in the durability running test under the high load condition although the cord did not pop out in such a short time as in the results of each Comparative Example, is considered that, as the determination of the maximum value Y of the belt width reduction rate in the finite element method analysis was B and thus the comprehensive determination was rank B, the compression amount of the cog portion in the belt width direction was slightly large, and the stress was concentrated due to the buckling deformation from the lateral pressure, which causes cracks in the adhesion interface between the cord and the rubber layer to cause interface peeling, thereby leading to the cord popping out.

In addition, as for the raw edge cogged V-belts 10A of Example 7 shown in Table 2 and Example 17 shown in Table 6, in the durability running test under the high load condition, the cord popped out (separated) from the side surface of the belt (the surface in contact with the pulley) at the stage of running for 120 hours before cracks were generated at the deepest portion of the cog valley, and it reached the end of the life. In addition, in the durability running test under the high temperature and high speed condition, cracks were generated at the deepest portion of the cog valley at the stage of running for 100 hours, and it reached the end of the life.

The reason why the belts did not run completely without abnormality in both the durability running test under the high load condition and the durability running test under the high temperature and high speed condition although the cord did not pop out and cracks did not occur in the deepest portion of the cog valley in such a short time as in the results of each Comparative Example, is considered that, as the determination of the maximum value X of the von Mises stress generated at the deepest portion of the cog valley in the finite element method analysis was B and thus the comprehensive determination was rank B, the deformation stress generated at the deepest portion of the cog valley was slightly large and cracks generated at the deepest portion of the cog valley on which the stress was concentrated, and the rubber was cured due to the heat generated in association with the deformation, and therefore, the interface between the cord and the rubber layer was peeled off, thereby leading to the cord popping out.

On the other hand, as for the raw edge cogged V-belts 10A of Examples 5, 6, 8 to 11, and 13 to 16, as the comprehensive determination was rank A in the finite element method analysis, even in the durability running tests, the belts had completed the durability running tests without any abnormalities such as cracks or the cord popping out.

The present invention is not limited to the embodiments and Examples described above, and modifications, improvements, or the like can be made as appropriate.

For example, in the above-described embodiment, the bottom portion 25 of the cog valley 12 is formed by the first arc 21 and the second arc 22. However, in the present invention, the bottom portion 25 may be formed of a plurality of continuous arcs, and may be formed of, for example, three or more arcs whose curvature radius decreases as the distance from the deepest portion A of the cog valley 12 increases.

The second arc 22 is defined as an arc having the smallest curvature radius among the plurality of arcs forming the bottom portion 25 of the cog valley 12. That is, in the case where the bottom portion 25 of the cog valley 12 is formed of three or more arcs, an arc at a position farthest from the deepest portion A of the cog valley 12 (that is, closest to the side wall 23 of the cog valley 12) is the second arc 22. In this case, the remaining arc(s) other than the first arc 21 and the second arc 22 is located between the first arc 21 and the second arc 22.

In addition, as described above, the second arc 22 in the case where the bottom portion 25 of the cog valley 12 is formed of two arcs (the first arc 21 and the second arc 22) was formed by connecting the first arc 21 and the extension line of the side wall 23 of the cog valley 12 in a curved shape so as to be tangent to the first arc 21 and the extension line. The second arc 22 in the case where the bottom portion 25 of the cog valley 12 is formed of three or more arcs may be formed by connecting the first arc 21 and the extension line of the side wall 23 of the cog valley 12 in a curved shape so as to be tangent to the first arc 21 and the extension line in the same manner as described above, or may be formed by connecting the remaining arc(s), other than the first arc 21 and the second arc 22, and the extension line of the side wall 23 of the cog valley 12 in a curved shape so as to be tangent to the remaining arc(s) and the extension line.

Further, the present invention may be a raw edge double cogged V-belt in which cogs are formed on both the inner peripheral side and the outer peripheral side of the raw edge V-belt.

Although various embodiments have been described above with reference to the drawings, it is needless to say that the present invention is not limited to such examples. It is apparent to those skilled in the art that various changes and modifications can be conceived within the scope of the claims, and it is also understood that such variations and modifications belong to the technical scope of the present invention. In addition, constituent elements in the embodiments described above may be combined freely within a range not departing from the spirit of the present invention.

The present application is based on Japanese Patent Application (No. 2019-225458) filed on Dec. 13, 2019, and Japanese Patent Application (No. 2020-026205) filed on Feb. 19, 2020, the contents of which are incorporated by reference.

REFERENCE SIGNS LIST

10: cogged V-belt (raw edge cogged V-belt)
10$_i$: inner peripheral side
11: cog ridge
12: cog valley
13: cog portion
18: cord
21: first arc (a plurality of arc)
22: second arc (a plurality of arc)
23: side wall of cog valley (side surface of cog ridge)
24: top portion
25: bottom portion of cog valley
A: deepest portion of cog valley
H: belt thickness
$H_1$: cog height
$H_2$: center-valley thickness
P: cog pitch
$R_1$: curvature radius of first arc
$R_2$: curvature radius of second arc
VC: virtual circle
W: belt upper width
θ: cog angle

The invention claimed is:

1. A cogged V-belt, comprising:
    a cog portion in which a plurality of cog ridges and cog valleys are alternately provided along a belt longitudinal direction, provided at least on a belt inner peripheral side, and
    having a belt thickness H of 19 to 36 mm and a cog height $H_1$ of 14 to 19 mm,
    wherein the cog valley has a cross-sectional shape in a cross section in the belt longitudinal direction, comprising:
        a bottom portion formed by combining a plurality of continuous arcs; and
        side walls of the cog valley inclined with respect to a belt thickness direction,
    wherein the plurality of arcs includes:
        a first arc that passes through the deepest portion of the cog valley, has a diameter larger than a virtual circle tangent to three points of the deepest portion and the side walls on both sides of the cog valley, and has a curvature radius $R_1$ of 7.5 to 9.5 mm; and
        a second arc that connects the first arc and an extension line of a side wall in a curved shape so as to be tangent to the first arc and the extension line of the side wall, and has a curvature radius $R_2$ of 1.5 to 2.8 mm.

2. The cogged V-belt according to claim 1,
    wherein the second arc has a curvature radius $R_2$ of 1.8 to 2.5 mm.

3. The cogged V-belt according to claim 1, further comprising:
    a tension member layer including a cord arranged at intervals in a belt width direction,
    a tension rubber layer laminated on a belt outer peripheral side of the tension member layer, and
    a compression rubber layer laminated on the belt inner peripheral side of the tension member layer, and
    having a center-valley thickness $H_2$, which is a distance from a center portion of the cord to the deepest portion of the cog valley, being 6 to 13 mm, and a ratio of the center-valley thickness $H_2$ to the belt thickness H being 20 to 40%.

4. The cogged V-belt according to claim 1,
wherein the cog ridge has a side surface and a top portion, each formed in a straight line.

5. The cogged V-belt according to claim 1, being used for a power transmission belt of a belt-type variable speed device of a large-sized agricultural machine.

6. The cogged V-belt according to claim 1, wherein the belt thickness H is 19.8 to 36 mm.

7. The cogged V-belt according to claim 1, wherein the belt thickness H is 27 to 36 mm.

\* \* \* \* \*